(12) United States Patent
Lee

(10) Patent No.: US 10,288,851 B2
(45) Date of Patent: May 14, 2019

(54) FOUR-PIECE INFRARED SINGLE WAVELENGTH LENS SYSTEM

(71) Applicant: NEWMAX TECHNOLOGY CO., LTD., Tai-Chung (TW)

(72) Inventor: Chun-Sheng Lee, Tai-Chung (TW)

(73) Assignee: NEWMAX TECHNOLOGY CO., LTD., Tai-Chung (TW)

( * ) Notice: Subject to any disclaimer, the term of this patent is extended or adjusted under 35 U.S.C. 154(b) by 188 days.

(21) Appl. No.: 15/336,761

(22) Filed: Oct. 27, 2016

(65) Prior Publication Data
US 2018/0120535 A1    May 3, 2018

(51) Int. Cl.
*G02B 13/00* (2006.01)

(52) U.S. Cl.
CPC ......... *G02B 13/008* (2013.01); *G02B 13/004* (2013.01)

(58) Field of Classification Search
CPC ............................ G02B 13/004; G02B 13/008
USPC ......................................................... 359/357
See application file for complete search history.

(56) References Cited

U.S. PATENT DOCUMENTS

| 2013/0057969 A1* | 3/2013 | Lai | ........................... | G02B 9/34 359/715 |
| 2013/0321920 A1* | 12/2013 | Suzuki | ................... | G02B 27/42 359/566 |
| 2014/0184880 A1* | 7/2014 | Ahn | ..................... | G02B 13/004 348/342 |

* cited by examiner

*Primary Examiner* — Wen Huang
(74) *Attorney, Agent, or Firm* — Bruce Stone LLP; Joseph Bruce

(57) ABSTRACT

A four-piece infrared single wavelength lens system, in order from an object side to an image side, includes: an aperture stop; a first lens element with a positive refractive power having an object-side surface being convex and an image-side surface being concave near the optical axis; a second lens element with a positive refractive power having an object-side surface being concave and an image-side surface being convex near the optical axis; a third lens element with a refractive power having an object-side surface being concave and an image-side surface being convex near the optical axis; and a fourth lens element with a refractive power having an object-side surface being convex and an image-side surface being concave near the optical axis, and at least one inflection point being formed on one of the object-side surface and the image-side surface of the fourth lens element.

15 Claims, 14 Drawing Sheets

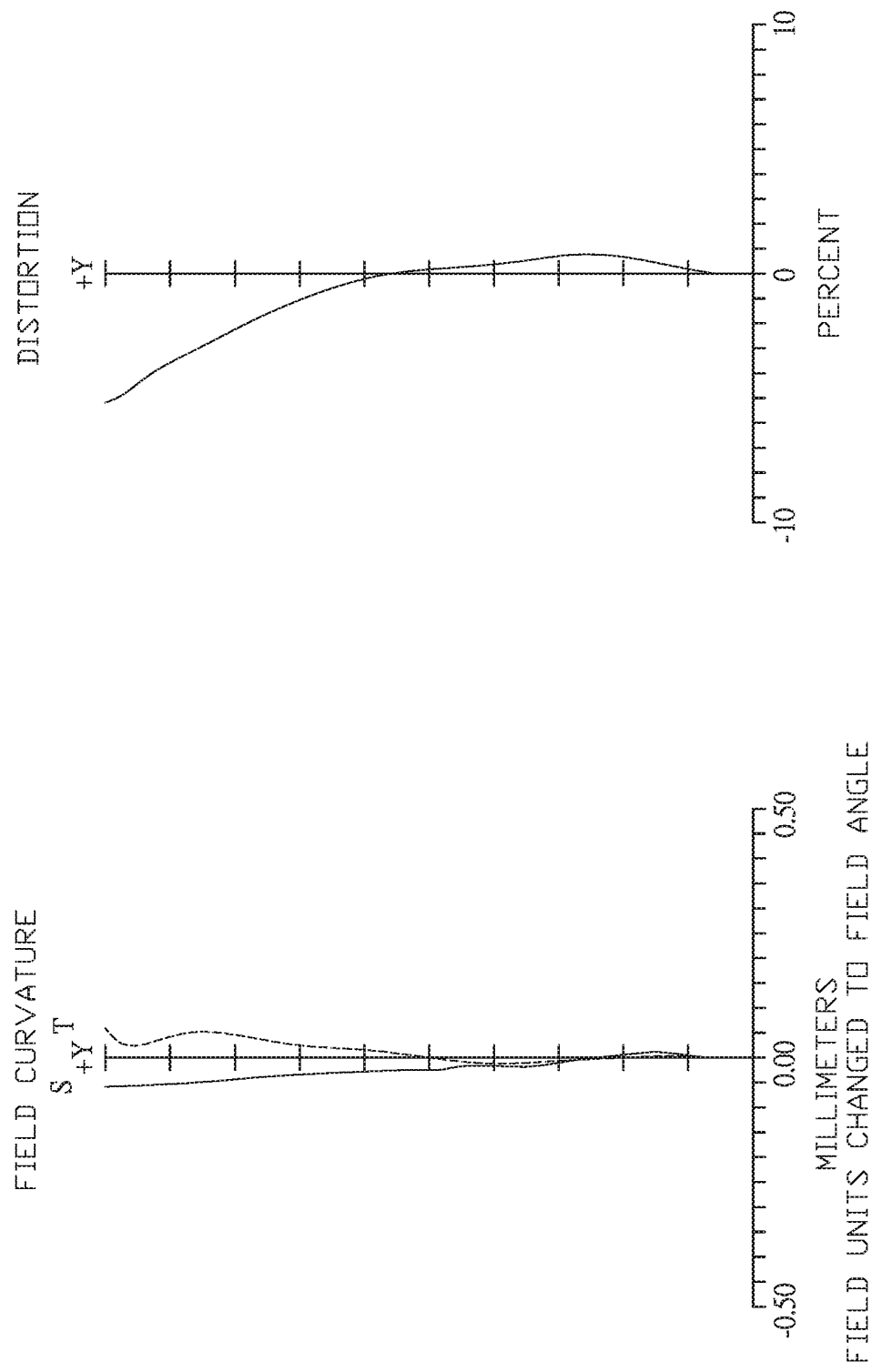

FOUR-PIECE INFRARED SINGLE WAVELENGTH LENS SYSTEM

BACKGROUND

Field of the Invention

The present invention relates to an imaging lens, and more particularly to a four-piece infrared single wavelength lens system.

Related Prior Art

Nowadays, digital imaging technology is constantly innovating and changing, especially the digital carriers used in the digital camera and mobile is also becoming miniaturized. The electronic sensors, such as CCD and CMOS, need to be further miniaturized. For example, in addition to being used in the imaging field, infrared focusing lens has also found wide application in game machines in infrared receiving and sensing. In order to increase the sensing area of the game machine, the current lens systems for receiving infrared wavelength are mostly wide angle view lens.

The present applicant has proposed several infrared receiving lens systems, however, the current game machines are mostly 3D game machines for 3D games which are more realistic and make you feel like right in the scene. The lens systems in the previous applications of the applicant are all designed for 2D game play, and therefore are unable to satisfy the requirement of 3D game play in depth sensing.

Moreover, the infrared receiving and sensing lens systems for use in the game machines are made of plastic for the purpose of cost down. Plastic lens has poor light transmittance and will adversely affect the depth detection accuracy of the game machine. Besides, plastic lens is susceptible to environmental temperature, which will result in change of the focal length, so that the lens will lose focus and will be unable to detect precisely.

The present invention has arisen to mitigate and/or obviate the afore-described disadvantages.

SUMMARY

The present invention is aimed at providing a four-piece infrared single wavelength lens system having high image quality, high resolution, low distortion and low sensitivity to assembly.

According to one aspect of the present invention, a four-piece infrared single wavelength lens system, in order from an object side to an image side, comprises: an aperture stop; a first lens element with a positive refractive power having an object-side surface being convex near an optical axis and an image-side surface being concave near the optical axis, at least one of the object-side and image-side surfaces of the first lens element being aspheric; a second lens element with a positive refractive power having an object-side surface being concave near the optical axis and an image-side surface being convex near the optical axis, at least one of the object-side and image-side surfaces of the second lens element being aspheric; a third lens element with a refractive power having an object-side surface being concave near the optical axis and an image-side surface being convex near the optical axis, both the object-side and image-side surfaces of the third lens element being aspheric; and a fourth lens element with a refractive power having an object-side surface being convex near the optical axis and an image-side surface being concave near the optical axis, one of the object-side and image-side surfaces of the fourth lens element being aspheric, and at least one inflection point being formed on one of the object-side surface and the image-side surface of the fourth lens element.

Preferably, a focal length of the first lens element is f1, a focal length of the second lens element is f2, and they satisfy the relation: $0.8<f1/f2<2.3$, so that the refractive power of the first lens element and the second lens element are more suitable, it will be favorable to obtain a wide field of view and avoid the excessive increase of aberration of the system.

Preferably, a focal length of the second lens element is f2, a focal length of the third lens element is f3, and they satisfy the relation: $-0.6<f2/f3<0.5$, which promotes periphery resolution and luminance.

Preferably, a focal length of the third lens element is f3, a focal length of the fourth lens element is f4, and they satisfy the relation: $-28<f3/f4<3$, which can balance the refractive power distribution, and the assembling tolerance can be reduced to improve yield rate.

Preferably, a focal length of the first lens element is f1, a focal length of the third lens element is f3, and they satisfy the relation: $-0.9<f1/f3<0.7$, so that the positive refractive power of the first lens element can be effectively distributed to reduce the assembling tolerance of the four-piece infrared single wavelength lens system.

Preferably, a focal length of the second lens element is f2, a focal length of the fourth lens element is f4, and they satisfy the relation: $-1<f2/f4<0.2$, which can balance the positive refractive power of the lens system and facilitate the imaging quality.

Preferably, a focal length of the first lens element and the second lens element combined is f12, a focal length of the third lens element is f3, and they satisfy the relation: $-0.6<f12/f3<0.5$, it will be favorable to obtain a wide field of view and correct the image surface distortion.

Preferably, a focal length of the first lens element and the second lens element combined is f12, a focal length of the third lens element and the fourth lens element combined is f34, and they satisfy the relation: $-1.0<f12/f34<-0.05$, it will be favorable to obtain a wide field of view and correct the image surface distortion. Preferably, a focal length of the first lens element is f1, a focal length of the second lens element and the third lens element combined is f23, and they satisfy the relation: $0.3<f1/f23<2.1$. When $0.3<f1/f23<2.1$ is satisfied, a wide field of view can be provided and the resolution can be improved evidently.

Preferably, a focal length of the first lens element is f1, a focal length of the second lens element, the third lens element and the fourth lens element combined is f234, and they satisfy the relation: $0.3<f1/f234<1.3$, it will be favorable to obtain a wide field of view and correct the image surface distortion.

Preferably, a focal length of the first lens element, the second lens element and the third lens element combined is f123, the focal length of the fourth lens element is f4, and they satisfy the relation: $-1<f123/f4<0.1$. Appropriate refractive power is favorable to reduce the spherical aberration and astigmatism of the five-piece optical imaging lens effectively.

Preferably, a distance along the optical axis between the first lens element and the second lens element is T12, a central thickness of the second lens element along the optical axis is CT2, and they satisfy the following relation: $0.3<T12/CT2<1.0$, so that the incident off axis light passes through the first and second lens elements at a relatively high height, as a result, the second lens element has a power great enough to correct the field curvature, distortion and astigmatism, which is favorable to improve the imaging quality.

Preferably, a central thickness of the second lens element along the optical axis is CT2, a central thickness of the third lens element along the optical axis is CT3, and they satisfy the following relation: 0.5<CT2/CT3<2.2, which facilitates to the forming and uniformity of the lens.

Preferably, a central thickness of the third lens element along the optical axis is CT3, a distance along the optical axis between the third lens element and the fourth lens element is T34, and they satisfy the following relation: 7<CT3/T34<18, so that the total length of the lens system can be reduced by appropriate distribution of the thickness of the third lens element and the distance between the lens elements.

Preferably, an Abbe number of the first lens element is V1, an Abbe number of the second lens element is V2, and they satisfy the relation: 30<V1−V2<42, which is favorable to color difference correction.

Preferably, a maximal field of view of the four-piece infrared single wavelength lens system is FOV, and 70<FOV<100, so that the four-piece infrared single wavelength lens system has a wide field of view.

The present invention will be presented in further details from the following descriptions with the accompanying drawings, which show, for purpose of illustrations only, the preferred embodiments in accordance with the present invention.

BRIEF DESCRIPTION OF THE DRAWINGS

FIG. 7B shows the longitudinal spherical aberration curve, the astigmatic field curve and the distortion curve of the seventh embodiment of the present invention.

DETAILED DESCRIPTION

Figure 1A:
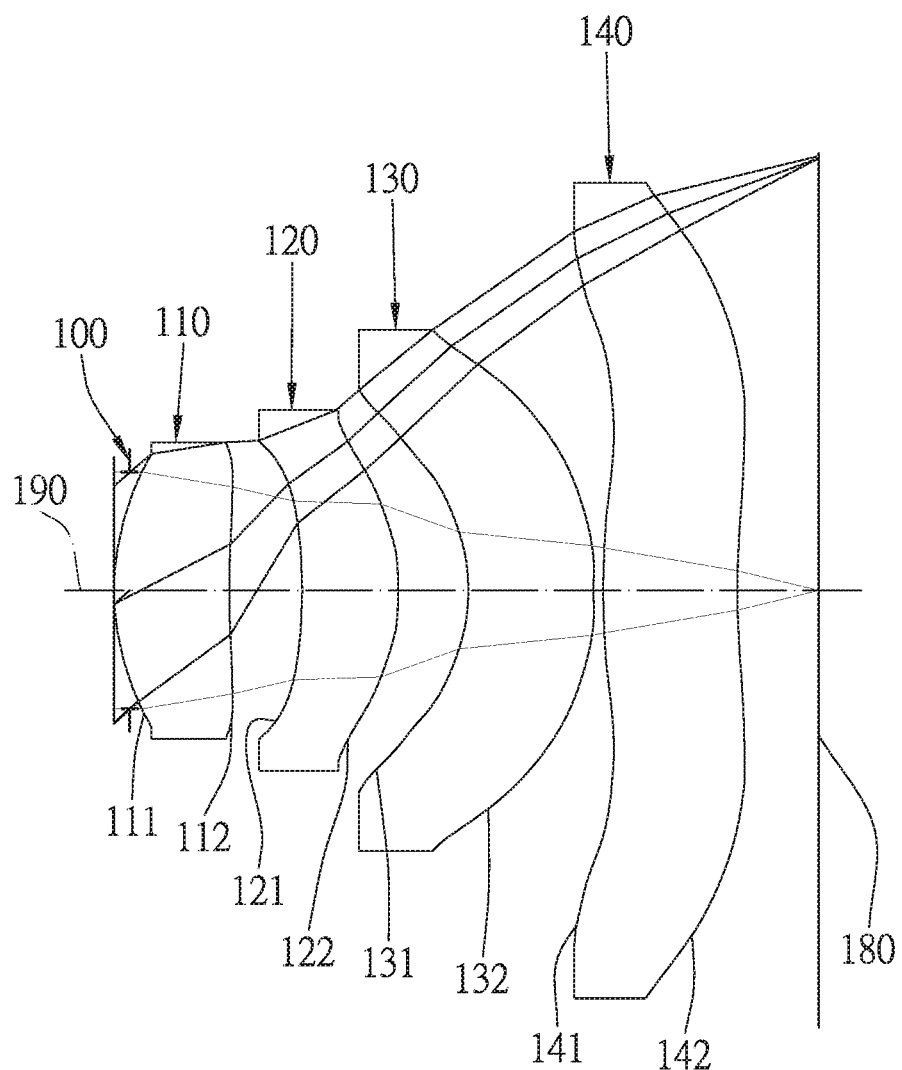
FIG. 1A shows a four-piece infrared single wavelength lens system in accordance with a first embodiment of the present invention.
Figure 1B:
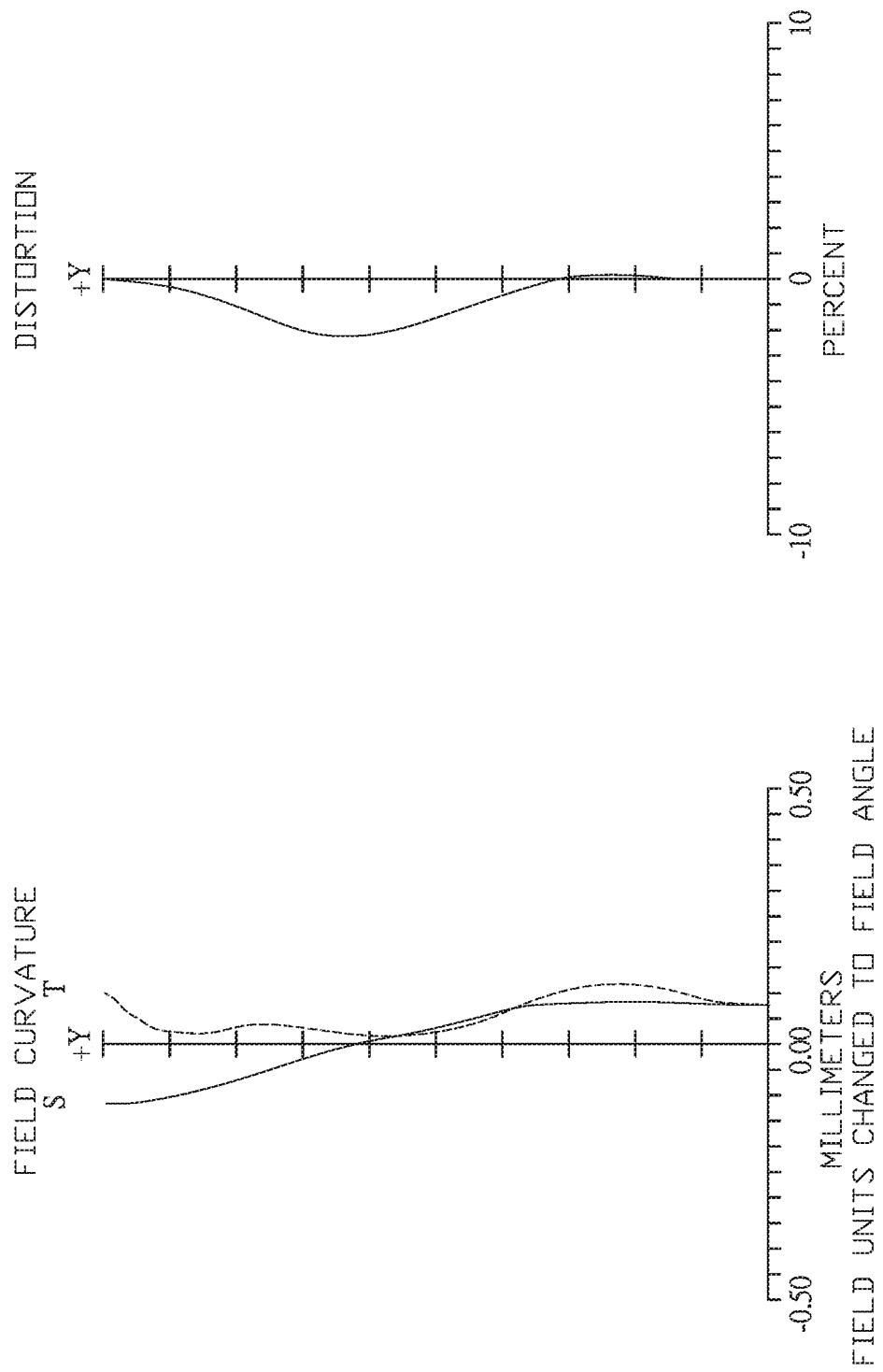
FIG. 1B shows the longitudinal spherical aberration curve, the astigmatic field curve and the distortion curve of the first embodiment of the present invention.

FIG. 1A shows a four-piece infrared single wavelength lens system in accordance with a first embodiment of the present invention, and FIG. 1B shows, in order from left to right, the longitudinal spherical aberration curves, the astigmatic field curves, and the distortion curve of the first embodiment of the present invention. The four-piece infrared single wavelength lens system in accordance with the first embodiment of the present invention comprises an aperture stop 100 and an optical assembly. The optical assembly comprises, in order from an object side to an image side: a first lens element 110, a second lens element 120, a third lens element 130, a fourth lens element 140, and an image plane 180, wherein the infrared single wavelength lens system has a total of four lens elements with refractive power. The aperture stop 100 is located between an image-side surface 112 of the first lens element 110 and an object to be photographed.

The first lens element 110 with a positive refractive power has an object-side surface 111 being convex near an optical axis 190 and the image-side surface 112 being concave near the optical axis 190, both the object-side and image-side surfaces 111, 112 are aspheric, and the first lens element 110 is made of plastic material.

The second lens element 120 with a positive refractive power has an object-side surface 121 being concave near the optical axis 190 and an image-side surface 122 being convex near the optical axis 190, both the object-side and image-side surfaces 121, 122 are aspheric, and the second lens element 120 is made of plastic material.

The third lens element 130 with a negative refractive power has an object-side surface 131 being concave near the optical axis 190 and an image-side surface 132 being convex near the optical axis 190, both the object-side and image-side surfaces 131, 132 are aspheric, the third lens element 130 is made of plastic material.

The fourth lens element 140 with a positive refractive power has an object-side surface 141 being convex near the optical axis 190 and an image-side surface 142 being concave near the optical axis 190, both the object-side and image-side surfaces 141, 142 are aspheric, the fourth lens element 140 is made of plastic material, and at least one inflection point is formed on the object-side surface 141 and the image-side surface 142 of the fourth lens element 140.

The equation for the aspheric surface profiles of the first embodiment is expressed as follows:

$$z = \frac{ch^2}{1+[1-(k+1)c^2h^2]^{0.5}} + Ah^4 + Bh^6 + Ch^8 + Dh^{10} + Eh^{12} + Gh^{14} + \ldots$$

$$z = \frac{ch^2}{1+[1-(k+1)c^2h^2]^{0.5}} + Ah^4 + Bh^6 + Ch^8 + Dh^{10} + Eh^{12} + Gh^{14} + \ldots$$

z represents the distance of a point on the aspheric surface at a height h from the optical axis 190 relative to a plane perpendicular to the optical axis at the vertex of the aspheric surface;

c is a paraxial curvature equal to 1/R (R: a paraxial radius of curvature);

h represents a vertical distance from the point on the curve of the aspheric surface to the optical axis 190;

k represents the conic constant;

A, B, C, D, E, G . . . : represent the high-order aspheric coefficients.

In the first embodiment of the present four-piece infrared single wavelength lens system, the focal length of the optical imaging lens is f, the f-number of the optical imaging lens is Fno, the maximal field of view of the four-piece infrared single wavelength lens system is FOV, and the following conditions are satisfied: f=1.699 mm; Fno=2; and FOV=84 degrees.

In the first embodiment of the present four-piece infrared single wavelength lens system, a focal length of the first lens element 110 is f1, a focal length of the second lens element 120 is f2, and they satisfy the relation: f1/f2=1.10.

In the first embodiment of the present four-piece infrared single wavelength lens system, the focal length of the second lens element 120 is f2, a focal length of the third lens element 130 is f3, and they satisfy the relation: f2/f3=−0.41.

In the first embodiment of the present four-piece infrared single wavelength lens system, the focal length of the third lens element 130 is f3, a focal length of the fourth lens element 140 is f4, and they satisfy the relation: f3/f4=−0.15.

In the first embodiment of the present four-piece infrared single wavelength lens system, the focal length of the first lens element 110 is f1, the focal length of the third lens element 130 is f3, and they satisfy the relation: f1/f3=−0.45.

In the first embodiment of the present four-piece infrared single wavelength lens system, the focal length of the second lens element 120 is f2, the focal length of the fourth lens element 140 is f4, and they satisfy the relation: f2/f4=0.06.

In the first embodiment of the present four-piece infrared single wavelength lens system, a focal length of the first lens element 110 and the second lens element 120 combined is f12, the focal length of the third lens element 130 is f3, and they satisfy the relation: f12/f3=−0.27.

In the first embodiment of the present four-piece infrared single wavelength lens system, the focal length of the first lens element 110 and the second lens element 120 combined is f12, a focal length of the third lens element 130 and the fourth lens element 140 combined is f34, and they satisfy the relation: f12/f34=−0.24.

In the first embodiment of the present four-piece infrared single wavelength lens system, the focal length of the first lens element 110 is f1, a focal length of the second lens element 120 and the third lens element 130 combined is f23, and they satisfy the relation: f1/f23=0.52.

In the first embodiment of the present four-piece infrared single wavelength lens system, the focal length of the first lens element 110 is f1, a focal length of the second lens element 120, the third lens element 130 and the fourth lens element 140 combined is f234, and they satisfy the relation: f1/f234=0.62.

In the first embodiment of the present four-piece infrared single wavelength lens system, a focal length of the first lens element 110, the second lens element 120 and the third lens element 130 combined is f123, the focal length of the fourth lens element 140 is f4, and they satisfy the relation: f123/f4=0.06.

In the first embodiment of the present four-piece infrared single wavelength lens system, a distance along the optical axis 190 between the first lens element 110 and the second lens element 120 is T12, a central thickness of the second lens element 120 along the optical axis 190 is CT2, and they satisfy the following relation: T12/CT2=0.76.

In the first embodiment of the present four-piece infrared single wavelength lens system, the central thickness of the second lens element 120 along the optical axis 190 is CT2, a central thickness of the third lens element 130 along the optical axis 190 is CT3, and they satisfy the following relation: CT2/CT3=0.77.

In the first embodiment of the present four-piece infrared single wavelength lens system, the central thickness of the third lens element 130 along the optical axis 190 is CT3, a distance along the optical axis 190 between the third lens element 130 and the fourth lens element 140 is T34, and they satisfy the following relation: CT3/T34=14.15.

In the first embodiment of the present four-piece infrared single wavelength lens system, an Abbe number of the first lens element 110 is V1, an Abbe number of the second lens element 120 is V2, and they satisfy the relation: V1−V2=32.03.

The detailed optical data of the first embodiment is shown in table 1, and the aspheric surface data is shown in table 2.

TABLE 1

Embodiment 1
f(focal length) = 1.699 mm, Fno = 2.0, FOV = 84 deg.

| Surface | | Curvature Radius | | Thickness | Material | index | Abbe # | Focal length |
|---|---|---|---|---|---|---|---|---|
| 0 | object | plane | | 1000.000 | | | | |
| 1 | | plane | | 0.054 | | | | |
| 2 | Aperture stop | plane | | −0.054 | | | | |
| 3 | lens 1 | 0.927 | (ASP) | 0.397 | plastic | 1.535 | 56.000 | 2.162 |
| 4 | | 4.238 | (ASP) | 0.251 | | | | |
| 5 | lens 2 | −1.712 | (ASP) | 0.330 | plastic | 1.636 | 23.970 | 1.959 |
| 6 | | −0.760 | (ASP) | 0.246 | | | | |
| 7 | lens 3 | −0.627 | (ASP) | 0.430 | plastic | 1.535 | 56.000 | −4.795 |
| 8 | | −1.030 | (ASP) | 0.030 | | | | |
| 9 | lens 4 | 2.628 | (ASP) | 0.465 | plastic | 1.535 | 56.000 | 31.152 |
| 10 | | 2.938 | (ASP) | 0.278 | | | | |
| 11 | image plane | plane | | | | | | |

TABLE 2

Aspheric Coefficients

| | \multicolumn{4}{c}{surface} | | | |
|---|---|---|---|---|
| | 3 | 4 | 5 | 6 |
| K: | 2.7466E−01 | 6.3662E+01 | 1.8161E+00 | −6.5277E−01 |
| A: | −3.9893E−01 | 1.6880E−03 | −5.1411E−01 | −1.2423E−01 |
| B: | 7.8566E+00 | −3.6812E+00 | 8.8049E+00 | 1.7319E+00 |
| C: | −8.4021E+01 | 5.7430E+00 | −1.5882E+02 | −1.0121E+01 |
| D: | 4.4413E+02 | 1.7782E+01 | 1.1206E+03 | 2.9003E+01 |
| E: | −1.2668E+03 | −2.5929E+02 | −3.8795E+03 | −1.6899E+00 |
| F: | 1.6104E+03 | 4.6095E+02 | 5.1072E+03 | −2.6775E+01 |

| | \multicolumn{4}{c}{surface} | | | |
|---|---|---|---|---|
| | 7 | 8 | 9 | 10 |
| K: | −4.0430E−01 | 4.3858E−02 | −2.2341E+01 | −1.8195E+02 |
| A: | −4.9160E−01 | 1.2077E−01 | −4.4897E−02 | 1.6967E−01 |
| B: | 7.9295E+00 | −1.2569E+00 | −5.7529E−01 | −1.0082E+00 |
| C: | −4.2593E+01 | 2.5537E+00 | 7.2495E−01 | 1.3741E+00 |
| D: | 1.2038E+02 | −2.1306E+00 | −3.5764E−01 | −9.1495E−01 |
| E: | −1.6240E+02 | −2.8484E−01 | 8.4731E−02 | 2.9871E−01 |
| F: | 9.1947E+01 | 1.2878E+00 | −8.4494E−03 | −3.7882E−02 |

The units of the radius of curvature, the thickness and the focal length in table 1 are expressed in mm, the surface numbers 0-11 represent the surfaces sequentially arranged from the object-side to the image-side along the optical axis. In table 2, k represents the conic coefficient of the equation of the aspheric surface profiles, and A, B, C, D, E, F, G, H . . . : represent the high-order aspheric coefficients. The tables presented below for each embodiment are the corresponding schematic parameter and aberration curves, and the definitions of the tables are the same as Table 1 and Table 2 of the first embodiment. Therefore, an explanation in this regard will not be provided again.

Figure 2A:
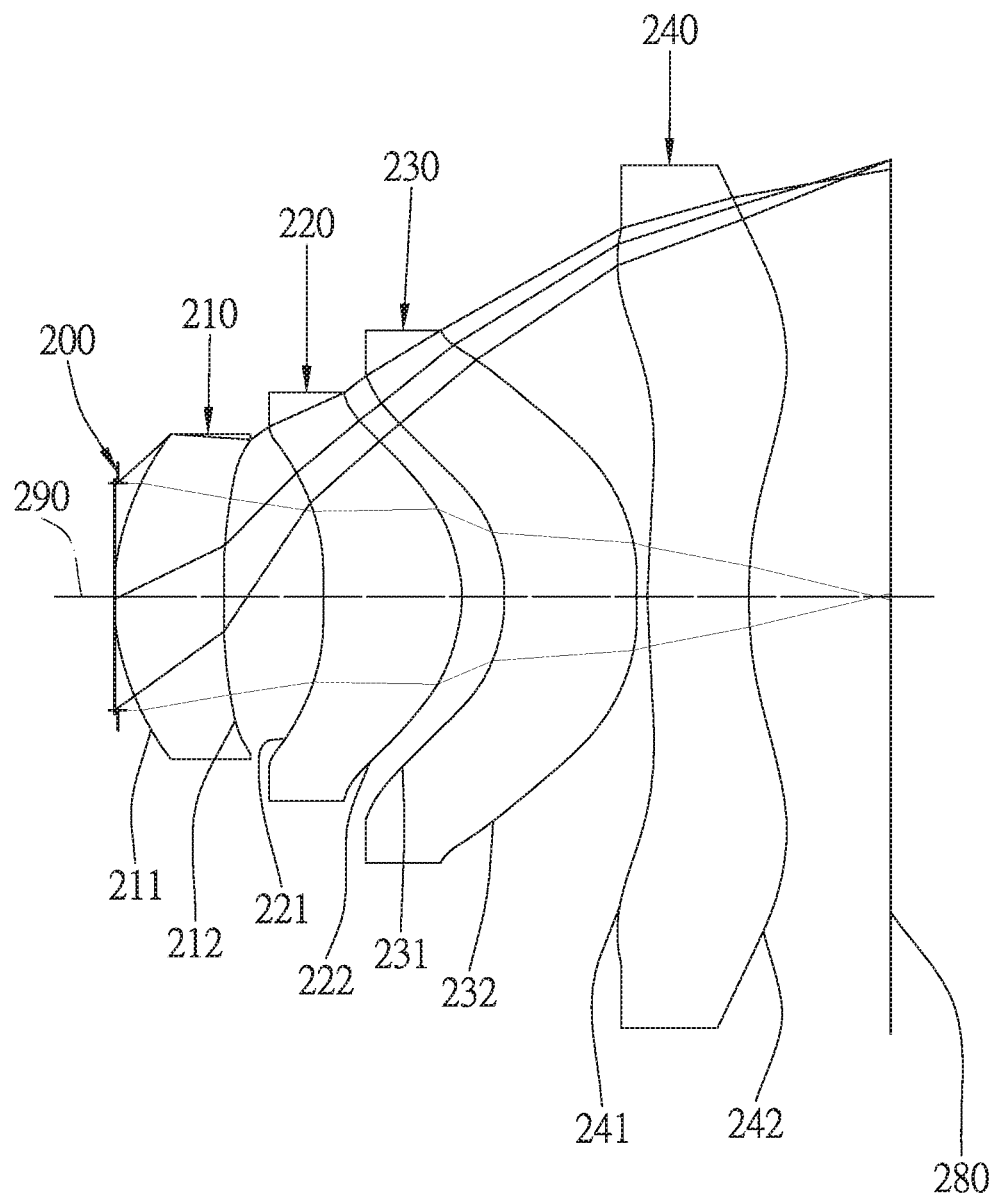
FIG. 2A shows a four-piece infrared single wavelength lens system in accordance with a second embodiment of the present invention.
Figure 2B:
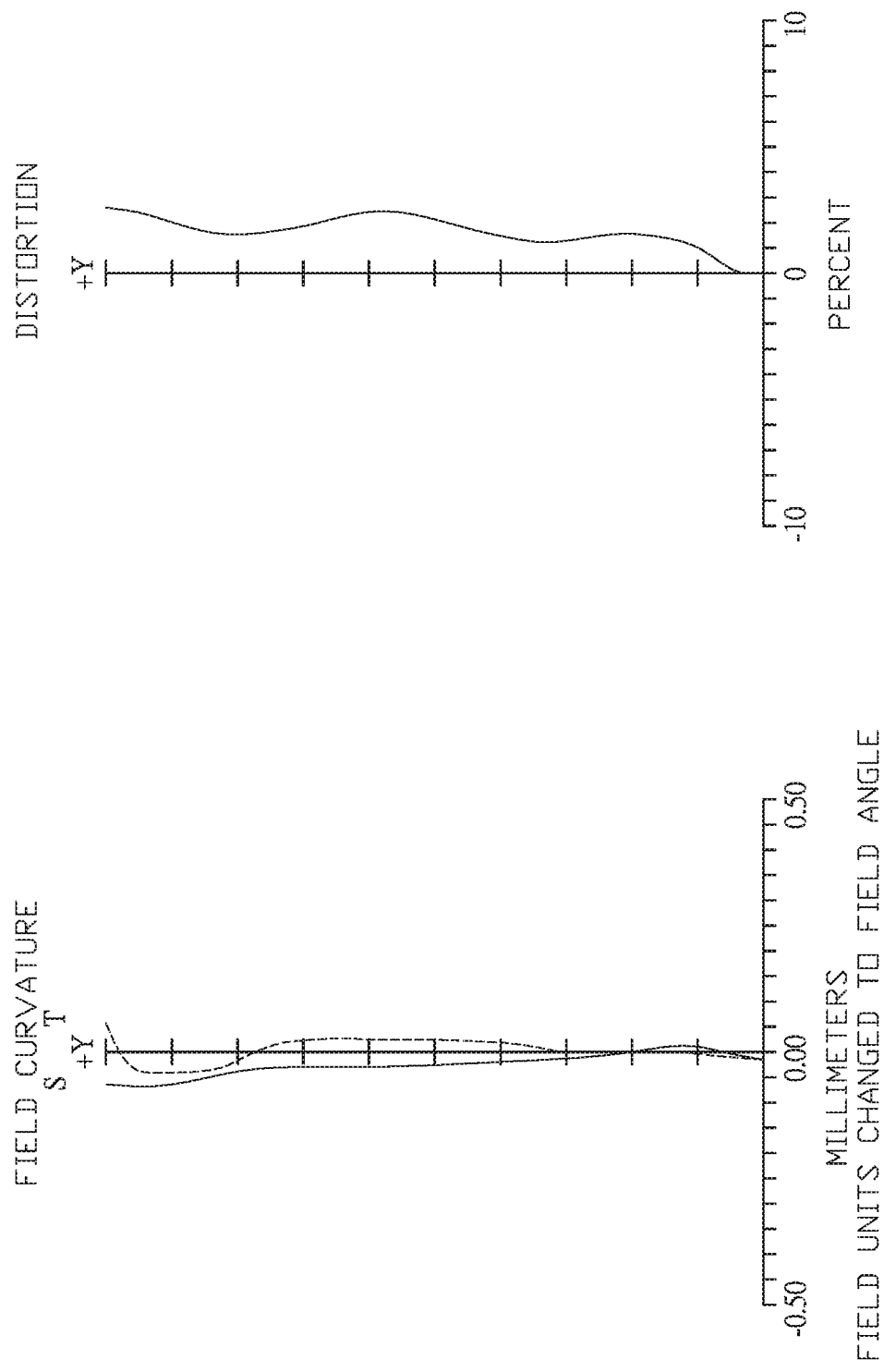
FIG. 2B shows the longitudinal spherical aberration curve, the astigmatic field curve and the distortion curve of the second embodiment of the present invention.

FIG. 2A shows a four-piece infrared single wavelength lens system in accordance with a second embodiment of the present invention, and FIG. 2B shows, in order from left to right, the longitudinal spherical aberration curves, the astigmatic field curves, and the distortion curve of the second embodiment of the present invention. The four-piece infrared single wavelength lens system in accordance with the second embodiment of the present invention comprises an aperture stop 200 and an optical assembly. The optical assembly comprises, in order from an object side to an image side: a first lens element 210, a second lens element 220, a third lens element 230, a fourth lens element 240, and an image plane 280, wherein the infrared single wavelength lens system has a total of four lens elements with refractive power. The aperture stop 200 is located between an image-side surface 212 of the first lens element 210 and an object to be photographed.

The first lens element 210 with a positive refractive power has an object-side surface 211 being convex near an optical axis 290 and the image-side surface 212 being concave near the optical axis 290, both the object-side and image-side surfaces 211, 212 are aspheric, and the first lens element 210 is made of plastic material.

The second lens element 220 with a positive refractive power has an object-side surface 221 being concave near the optical axis 290 and an image-side surface 222 being convex near the optical axis 290, both the object-side and image-side surfaces 221, 222 are aspheric, and the second lens element 220 is made of plastic material.

The third lens element 230 with a negative refractive power has an object-side surface 231 being concave near the optical axis 290 and an image-side surface 232 being convex near the optical axis 290, both the object-side and image-side surfaces 231, 232 are aspheric, the third lens element 230 is made of plastic material.

The fourth lens element 240 with a positive refractive power has an object-side surface 241 being convex near the optical axis 290 and an image-side surface 242 being concave near the optical axis 290, both the object-side and image-side surfaces 241, 242 are aspheric, the fourth lens element 240 is made of plastic material, and at least one inflection point is formed on the object-side surface 241 and the image-side surface 242 of the fourth lens element 240.

The detailed optical data of the second embodiment is shown in table 3, and the aspheric surface data is shown in table 4.

TABLE 3

Embodiment 2
f(focal length) = 1.632 mm, Fno = 2.0, FOV = 83 deg.

| Surface | | Curvature Radius | | Thickness | Material | index | Abbe # | Focal length |
|---|---|---|---|---|---|---|---|---|
| 0 | object | plane | | 1000.000 | | | | |
| 1 | | plane | | 0.011 | | | | |
| 2 | Aperture stop | plane | | −0.011 | | | | |
| 3 | lens 1 | 0.945 | (ASP) | 0.378 | plastic | 1.535 | 56.000 | 2.481 |
| 4 | | 2.936 | (ASP) | 0.341 | | | | |
| 5 | lens 2 | −1.505 | (ASP) | 0.474 | plastic | 1.636 | 23.970 | 1.272 |
| 6 | | −0.577 | (ASP) | 0.149 | | | | |
| 7 | lens 3 | −0.564 | (ASP) | 0.456 | plastic | 1.535 | 56.000 | −4.128 |
| 8 | | −0.973 | (ASP) | 0.030 | | | | |
| 9 | lens 4 | 1.634 | (ASP) | 0.352 | plastic | 1.535 | 56.000 | −57.533 |
| 10 | | 1.436 | (ASP) | 0.490 | | | | |
| 11 | image plane | plane | | | | | | |

TABLE 4

Aspheric Coefficients

| | surface | | | |
|---|---|---|---|---|
| | 3 | 4 | 5 | 6 |
| K: | 5.9616E−01 | 2.6402E+01 | 1.4962E+00 | −5.4963E−01 |
| A: | 6.1021E−03 | 1.0125E−01 | −6.2204E−01 | −8.6241E−01 |
| B: | 7.7156E−02 | −1.8684E−01 | −6.8131E+00 | 5.2831E+00 |
| C: | −6.2330E+00 | −1.0194E−01 | 4.9522E+01 | −2.9583E+01 |
| D: | 5.5739E+01 | 1.5587E+00 | −1.4710E+02 | 1.2496E+02 |
| E: | −1.8629E+02 | 7.8677E+00 | 1.6736E+02 | −2.2901E+02 |
| F: | 2.2738E+02 | 0.0000E+00 | 4.8794E+01 | 1.5713E+02 |

| | surface | | | |
|---|---|---|---|---|
| | 7 | 8 | 9 | 10 |
| K: | −5.2974E−01 | 5.7737E−02 | −8.6143E+01 | −2.1293E+01 |
| A: | −1.6827E+00 | −1.4091E+00 | −6.9176E−03 | 5.3720E−01 |
| B: | 3.8521E+00 | 3.9033E+00 | −9.2451E−01 | −1.5079E+00 |
| C: | 1.7025E+01 | −7.5597E+00 | 1.4265E+00 | 1.5043E+00 |
| D: | −6.1405E+01 | 1.3112E+01 | −8.9919E−01 | −7.9129E−01 |
| E: | 7.2037E+01 | −1.5109E+01 | 2.7222E−01 | 2.2164E−01 |
| F: | −2.5062E+01 | 7.7291E+00 | −3.3135E−02 | −2.6095E−02 |

In the second embodiment, the equation of the aspheric surface profiles of the aforementioned lens elements is the same as the equation of the first embodiment. Also, the definitions of these parameters shown in the following table are the same as those stated in the first embodiment with corresponding values for the second embodiment, so an explanation in this regard will not be provided again.

Moreover, these parameters can be calculated from Table 3 and Table 4 as the following values and satisfy the following conditions:

| Embodiment 2 | | | |
|---|---|---|---|
| f[mm] | 1.632 | f12/f34 | −0.34 |
| Fno | 2.0 | f1/f23 | 1.03 |
| FOV[deg.] | 83 | f1/f234 | 1.08 |
| f1/f2 | 1.95 | f123/f4 | −0.03 |
| f2/f3 | −0.31 | T12/CT2 | 0.72 |
| f3/f4 | 0.07 | CT2/CT3 | 1.04 |
| f1/f3 | −0.60 | CT3/T34 | 15.19 |
| f2/f4 | −0.02 | V1 − V2 | 32.03 |
| f12/f3 | −0.29 | | |

Figure 3A:
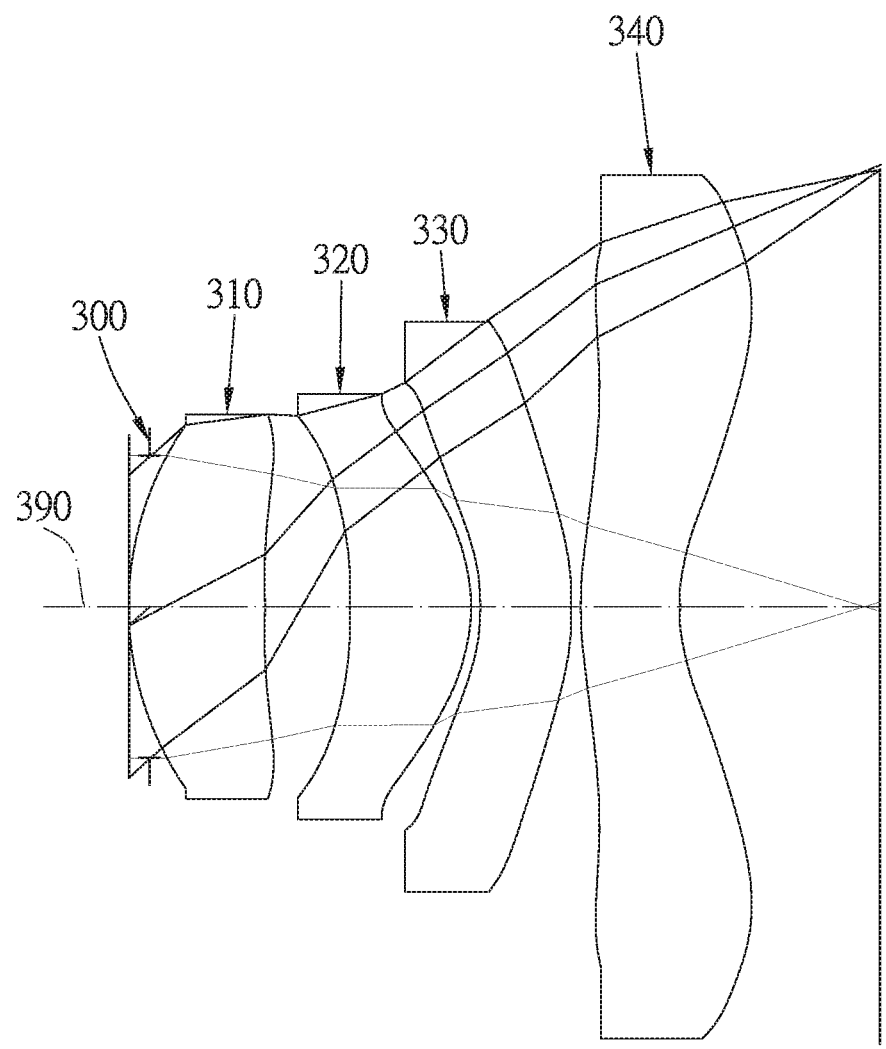
FIG. 3A shows a four-piece infrared single wavelength lens system in accordance with a third embodiment of the present invention.
Figure 3B:
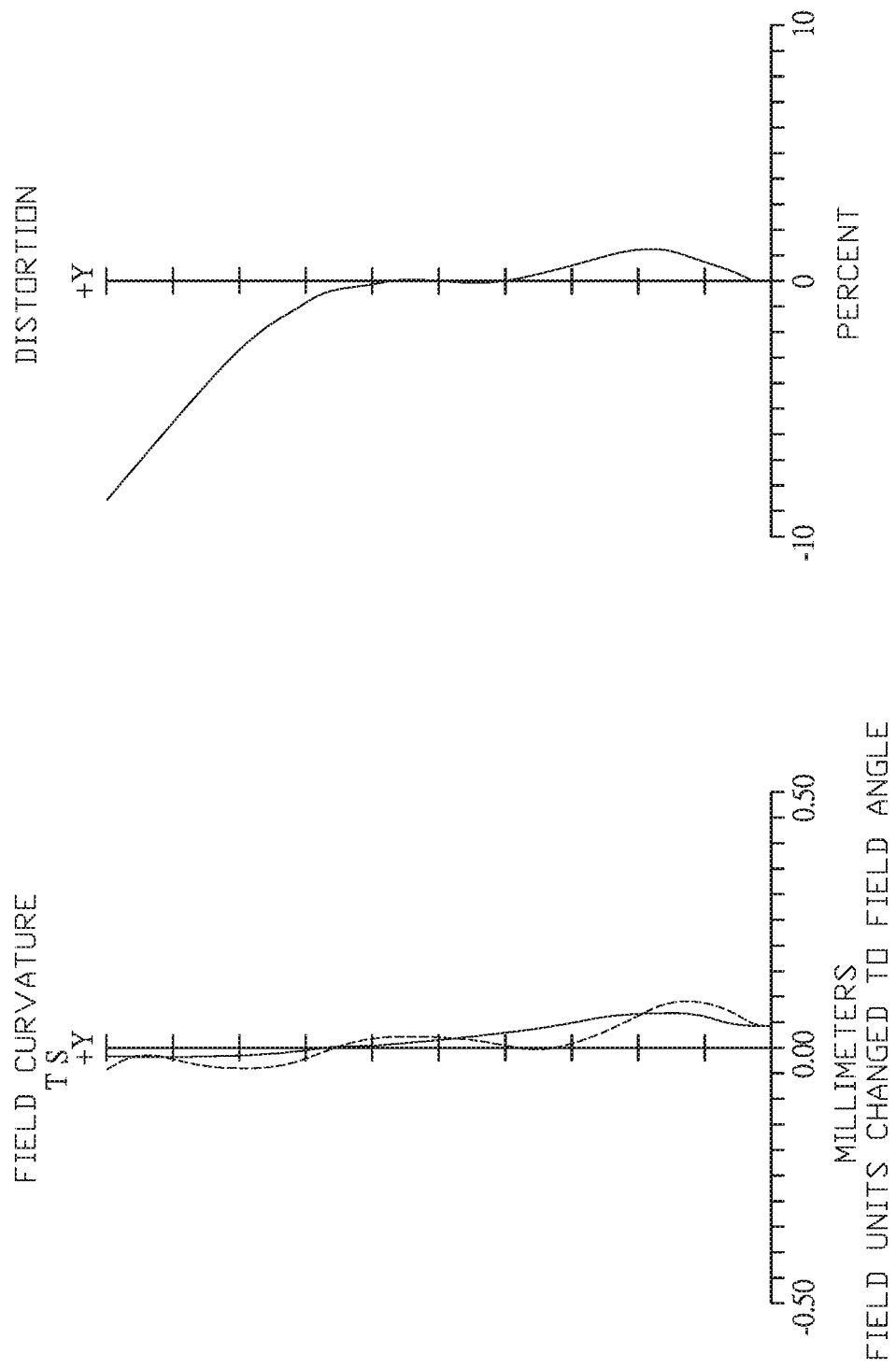
FIG. 3B shows the longitudinal spherical aberration curve, the astigmatic field curve and the distortion curve of the third embodiment of the present invention.

FIG. 3A shows a four-piece infrared single wavelength lens system in accordance with a third embodiment of the present invention, and FIG. 3B shows, in order from left to right, the longitudinal spherical aberration curves, the astigmatic field curves, and the distortion curve of the third embodiment of the present invention. The four-piece infrared single wavelength lens system in accordance with the third embodiment of the present invention comprises an aperture stop 300 and an optical assembly. The optical assembly comprises, in order from an object side to an image side: a first lens element 310, a second lens element 320, a third lens element 330, a fourth lens element 340, and an image plane 380, wherein the infrared single wavelength lens system has a total of four lens elements with refractive power. The aperture stop 300 is located between an image-side surface 312 of the first lens element 310 and an object to be photographed.

The first lens element 310 with a positive refractive power has an object-side surface 311 being convex near an optical axis 390 and the image-side surface 312 being concave near the optical axis 390, both the object-side and image-side surfaces 311, 312 are aspheric, and the first lens element 310 is made of plastic material.

The second lens element 320 with a positive refractive power has an object-side surface 321 being concave near the optical axis 390 and an image-side surface 322 being convex near the optical axis 390, both the object-side and image-side surfaces 321, 322 are aspheric, and the second lens element 320 is made of plastic material.

The third lens element 330 with a negative refractive power has an object-side surface 331 being concave near the optical axis 390 and an image-side surface 332 being convex near the optical axis 390, both the object-side and image-side surfaces 331, 332 are aspheric, the third lens element 330 is made of plastic material.

The fourth lens element 340 with a negative refractive power has an object-side surface 341 being convex near the optical axis 390 and an image-side surface 342 being concave near the optical axis 390, both the object-side and image-side surfaces 341, 342 are aspheric, the fourth lens element 340 is made of plastic material, and at least one inflection point is formed on the object-side surface 341 and the image-side surface 342 of the fourth lens element 340.

The detailed optical data of the third embodiment is shown in table 5, and the aspheric surface data is shown in table 6.

TABLE 5

Embodiment 3
f(focal length) = 1.813 mm, Fno = 1.8, FOV = 85 deg.

| Surface | | Curvature Radius | | Thickness | Material | index | Abbe # | Focal length |
|---|---|---|---|---|---|---|---|---|
| 0 | object | plane | | 1000.000 | | | | |
| 1 | | plane | | 0.073 | | | | |
| 2 | Aperture stop | plane | | −0.073 | | | | |
| 3 | lens 1 | 1.063 | (ASP) | 0.459 | plastic | 1.535 | 56.000 | 2.654 |
| 4 | | 3.770 | (ASP) | 0.289 | | | | |
| 5 | lens 2 | −1.947 | (ASP) | 0.407 | plastic | 1.636 | 23.970 | 1.380 |
| 6 | | −0.639 | (ASP) | 0.032 | | | | |
| 7 | lens 3 | −0.707 | (ASP) | 0.307 | plastic | 1.535 | 56.000 | −7.061 |
| 8 | | −1.004 | (ASP) | 0.031 | | | | |
| 9 | lens 4 | 1.111 | (ASP) | 0.335 | plastic | 1.535 | 56.000 | −2.710 |
| 10 | | 0.560 | (ASP) | 0.678 | | | | |
| 11 | image plane | plane | | | | | | |

TABLE 6

Aspheric Coefficients

| | surface | | | |
|---|---|---|---|---|
| | 3 | 4 | 5 | 6 |
| K: | 4.3772E−01 | 8.1615E+00 | 4.3595E+00 | −7.7595E−01 |
| A: | 3.0634E−02 | −3.3884E−02 | 3.5555E−02 | −1.4214E−01 |
| B: | −1.5479E+00 | 3.0336E−01 | −3.6641E+00 | 2.4741E+00 |
| C: | 1.3597E+01 | −2.4443E+00 | 1.3055E+01 | −5.8714E+00 |
| D: | −6.7572E+01 | 3.5695E−01 | −1.4214E+01 | 7.4533E+00 |
| E: | 1.5447E+02 | −7.5217E−03 | −8.0817E+00 | −2.0970E+00 |
| F: | −1.3080E+02 | 2.2889E+00 | 1.7803E+01 | 1.7837E+00 |

| | surface | | | |
|---|---|---|---|---|
| | 7 | 8 | 9 | 10 |
| K: | −2.2013E−01 | −3.5291E+00 | −4.5011E+01 | −6.9434E+00 |
| A: | 1.0176E+00 | 1.9415E−01 | −2.4745E−03 | 4.5947E−02 |
| B: | −2.7095E+00 | −2.7637E−01 | −3.1146E−01 | −3.9585E−01 |
| C: | 2.5084E+01 | 1.8891E+00 | 3.5957E−01 | 5.2385E−01 |
| D: | −8.1860E+01 | −5.3143E+00 | −1.3117E−01 | −3.8029E−01 |
| E: | 1.1595E+02 | 5.6695E+00 | 9.2867E−03 | 1.4139E−01 |
| F: | −5.9978E+01 | −2.1332E+00 | 2.0120E−03 | −2.0783E−02 |

In the third embodiment, the equation of the aspheric surface profiles of the aforementioned lens elements is the same as the equation of the first embodiment. Also, the definitions of these parameters shown in the following table are the same as those stated in the first embodiment with corresponding values for the second embodiment, so an explanation in this regard will not be provided again.

Moreover, these parameters can be calculated from Table 5 and Table 6 as the following values and satisfy the following conditions:

| Embodiment 3 | | | |
|---|---|---|---|
| f[mm] | 1.813 | f12/f34 | −0.73 |
| Fno | 1.8 | f1/f23 | 1.32 |
| FOV[deg.] | 85 | f1/f234 | 0.56 |
| f1/f2 | 1.92 | f123/f4 | −0.58 |
| f2/f3 | −0.20 | T12/CT2 | 0.71 |
| f3/f4 | 2.61 | CT2/CT3 | 1.32 |
| f1/f3 | −0.38 | CT3/T34 | 10.04 |
| f2/f4 | −0.51 | V1 − V2 | 32.03 |
| f12/f3 | −0.17 | | |

Figure 4A:
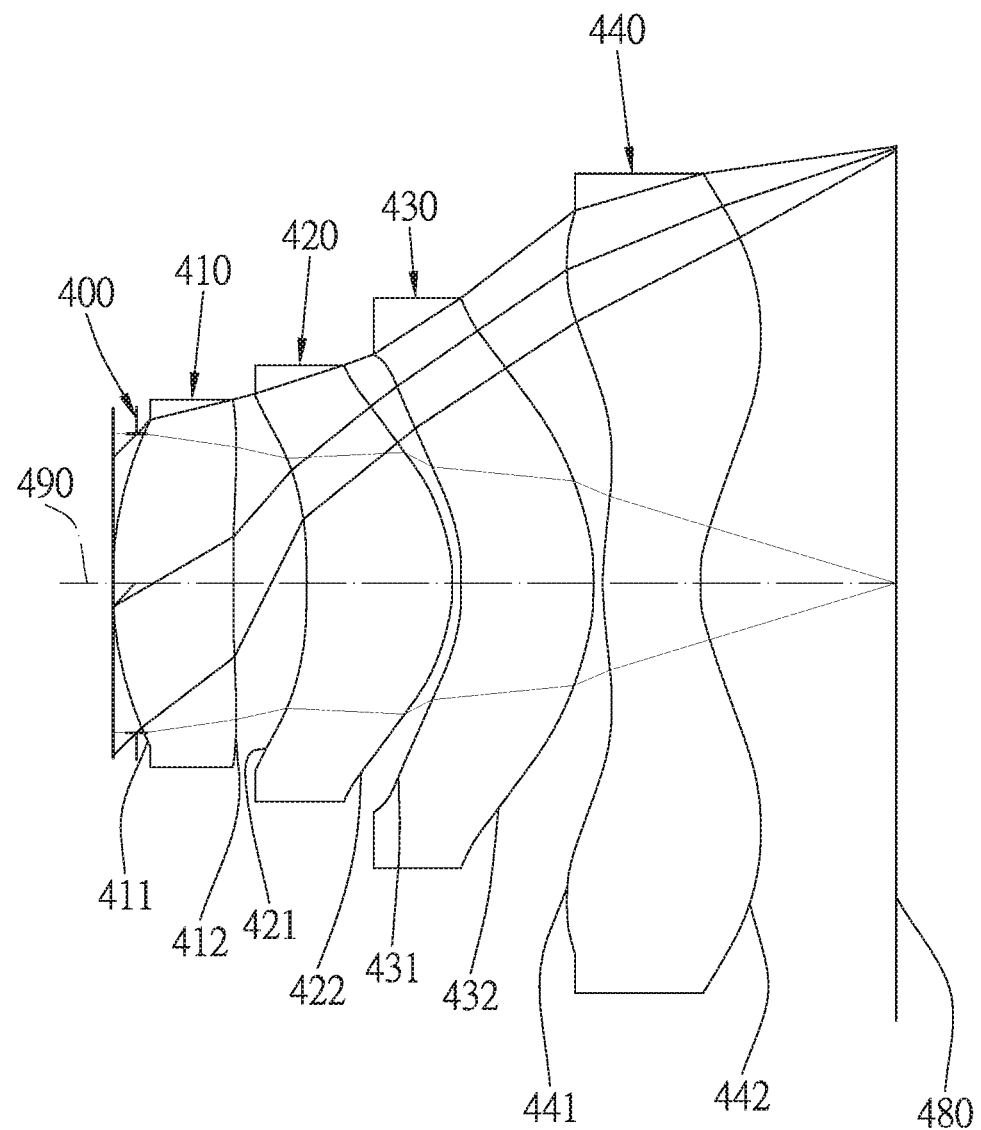
FIG. 4A shows a four-piece infrared single wavelength lens system in accordance with a fourth embodiment of the present invention.
Figure 4B:
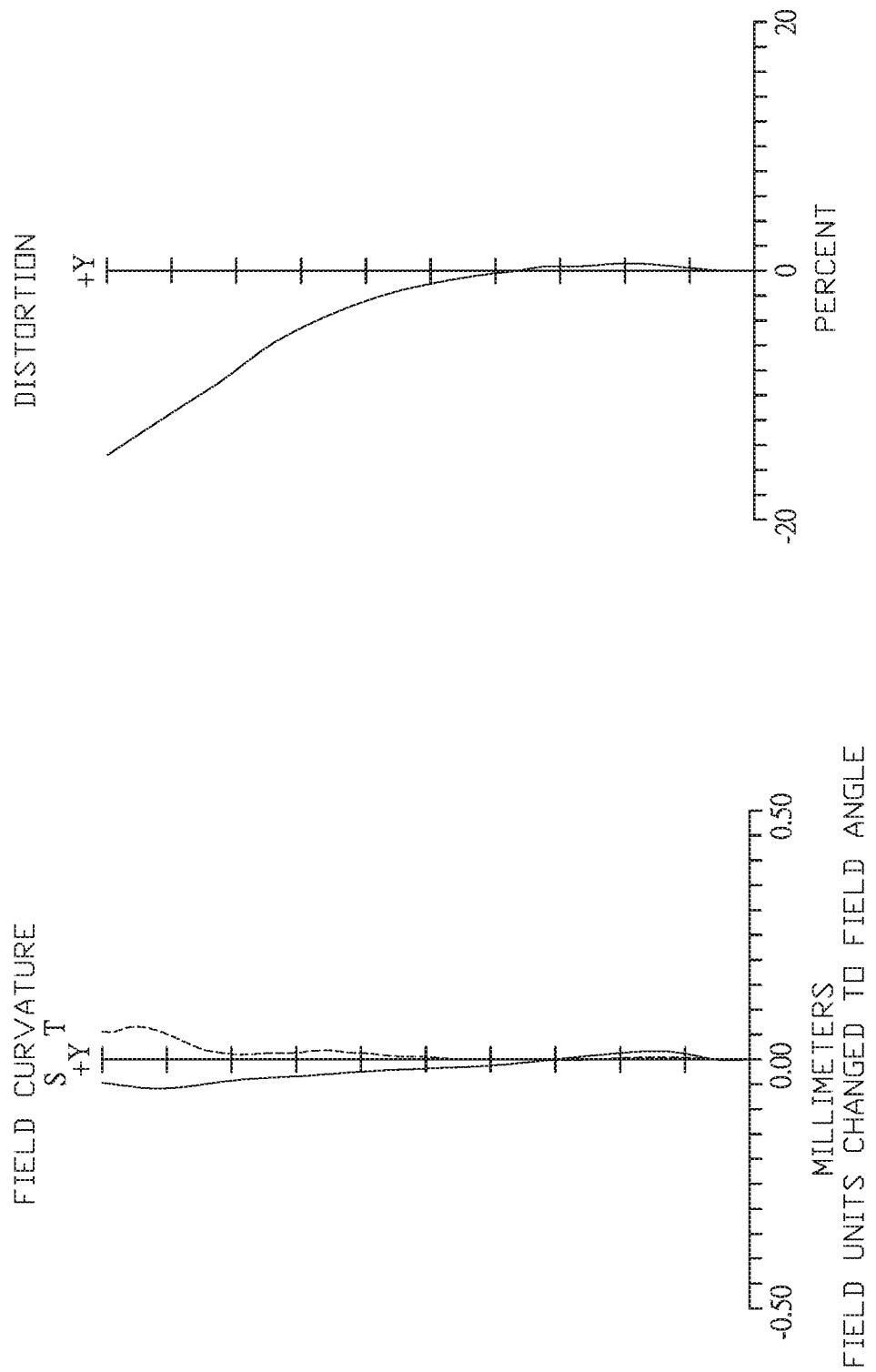
FIG. 4B shows the longitudinal spherical aberration curve, the astigmatic field curve and the distortion curve of the fourth embodiment of the present invention.

FIG. 4A shows a four-piece infrared single wavelength lens system in accordance with a fourth embodiment of the present invention, and FIG. 4B shows, in order from left to right, the longitudinal spherical aberration curves, the astigmatic field curves, and the distortion curve of the fourth embodiment of the present invention. The four-piece infrared single wavelength lens system in accordance with the fourth embodiment of the present invention comprises an aperture stop 400 and an optical assembly. The optical assembly comprises, in order from an object side to an image side: a first lens element 410, a second lens element 420, a third lens element 430, a fourth lens element 440, and an image plane 480, wherein the infrared single wavelength lens system has a total of four lens elements with refractive power. The aperture stop 400 is located between an image-side surface 412 of the first lens element 410 and an object to be photographed.

The first lens element 410 with a positive refractive power has an object-side surface 411 being convex near an optical axis 490 and the image-side surface 412 being concave near the optical axis 490, both the object-side and image-side surfaces 411, 412 are aspheric, and the first lens element 410 is made of plastic material.

The second lens element 420 with a positive refractive power has an object-side surface 421 being concave near the optical axis 490 and an image-side surface 422 being convex near the optical axis 490, both the object-side and image-side surfaces 421, 422 are aspheric, and the second lens element 420 is made of plastic material.

The third lens element 430 with a positive refractive power has an object-side surface 431 being concave near the optical axis 490 and an image-side surface 432 being convex near the optical axis 490, both the object-side and image-side surfaces 431, 432 are aspheric, the third lens element 430 is made of plastic material.

The fourth lens element 440 with a negative refractive power has an object-side surface 441 being convex near the optical axis 490 and an image-side surface 442 being concave near the optical axis 490, both the object-side and image-side surfaces 441, 442 are aspheric, the fourth lens element 440 is made of plastic material, and at least one inflection point is formed on the object-side surface 441 and the image-side surface 442 of the fourth lens element 440.

The detailed optical data of the fourth embodiment is shown in table 7, and the aspheric surface data is shown in table 8.

TABLE 7

Embodiment 4
f(focal length) = 1.715 mm, Fno = 1.7, FOV = 91 deg.

| Surface | | Curvature Radius | | Thickness | Material | index | Abbe # | Focal length |
|---|---|---|---|---|---|---|---|---|
| 0 | object | plane | | 1000.000 | | | | |
| 1 | | plane | | 0.084 | | | | |
| 2 | Aperture stop | plane | | −0.084 | | | | |
| 3 | lens 1 | 1.209 | (ASP) | 0.413 | plastic | 1.535 | 56.000 | 2.721 |
| 4 | | 6.778 | (ASP) | 0.253 | | | | |
| 5 | lens 2 | −2.035 | (ASP) | 0.498 | plastic | 1.636 | 23.970 | 1.342 |
| 6 | | −0.642 | (ASP) | 0.033 | | | | |
| 7 | lens 3 | −0.729 | (ASP) | 0.450 | plastic | 1.535 | 56.000 | 17.292 |
| 8 | | −0.819 | (ASP) | 0.031 | | | | |
| 9 | lens 4 | 1.295 | (ASP) | 0.335 | plastic | 1.535 | 56.000 | −1.974 |
| 10 | | 0.525 | (ASP) | 0.673 | | | | |
| 11 | image plane | plane | | | | | | |

TABLE 8

Aspheric Coefficients

| | surface | | | |
|---|---|---|---|---|
| | 3 | 4 | 5 | 6 |
| K: | 1.2759E−01 | −1.3726E+01 | 3.7951E+00 | −8.2829E−01 |
| A: | −1.5372E−02 | 4.1477E−02 | −3.4471E−01 | 1.8508E−01 |
| B: | −1.6480E+00 | −1.6268E+00 | −4.6330E+00 | −4.0546E+00 |
| C: | 2.1134E+01 | 5.4651E+00 | 2.3093E+01 | 2.2044E+01 |
| D: | −1.1850E+02 | −7.2308E+00 | −4.9387E+01 | −4.2706E+01 |
| E: | 2.9892E+02 | 7.5183E−02 | 7.1169E+01 | 3.3675E+01 |
| F: | −2.8863E+02 | 1.9301E−01 | −5.1320E+01 | −6.1222E+00 |

| | surface | | | |
|---|---|---|---|---|
| | 7 | 8 | 9 | 10 |
| K: | −2.5192E−01 | −1.9030E+00 | −2.4450E+01 | −4.3385E+00 |
| A: | 1.3182E+00 | 5.3644E−01 | −5.1493E−01 | −4.1283E−01 |
| B: | −9.6431E+00 | −3.5034E+00 | −5.4604E−01 | 4.0940E−01 |
| C: | 5.3226E+01 | 8.6254E+00 | 1.8718E+00 | −3.4965E−01 |
| D: | −1.3176E+02 | −1.1159E+01 | −1.5913E+00 | 1.6728E−01 |
| E: | 1.5705E+02 | 7.7735E+00 | 5.9132E−01 | −3.6484E−02 |
| F: | −7.3825E+01 | −2.2548E+00 | −8.3992E−02 | 2.5412E−03 |

In the fourth embodiment, the equation of the aspheric surface profiles of the aforementioned lens elements is the same as the equation of the first embodiment. Also, the definitions of these parameters shown in the following table are the same as those stated in the first embodiment with corresponding values for the second embodiment, so an explanation in this regard will not be provided again.

Moreover, these parameters can be calculated from Table 7 and Table 8 as the following values and satisfy the following conditions:

| Embodiment 4 | | | |
|---|---|---|---|
| f[mm] | 1.715 | f12/f34 | −0.64 |
| Fno | 1.7 | f1/f23 | 1.81 |
| FOV[deg.] | 91 | f1/f234 | 0.76 |
| f1/f2 | 2.03 | f123/f4 | −0.70 |
| f2/f3 | 0.08 | T12/CT2 | 0.51 |
| f3/f4 | −8.76 | CT2/CT3 | 1.11 |
| f1/f3 | 0.16 | CT3/T34 | 14.40 |
| f2/f4 | −0.68 | V1 − V2 | 32.03 |
| f12/f3 | 0.07 | | |

Figure 5A:
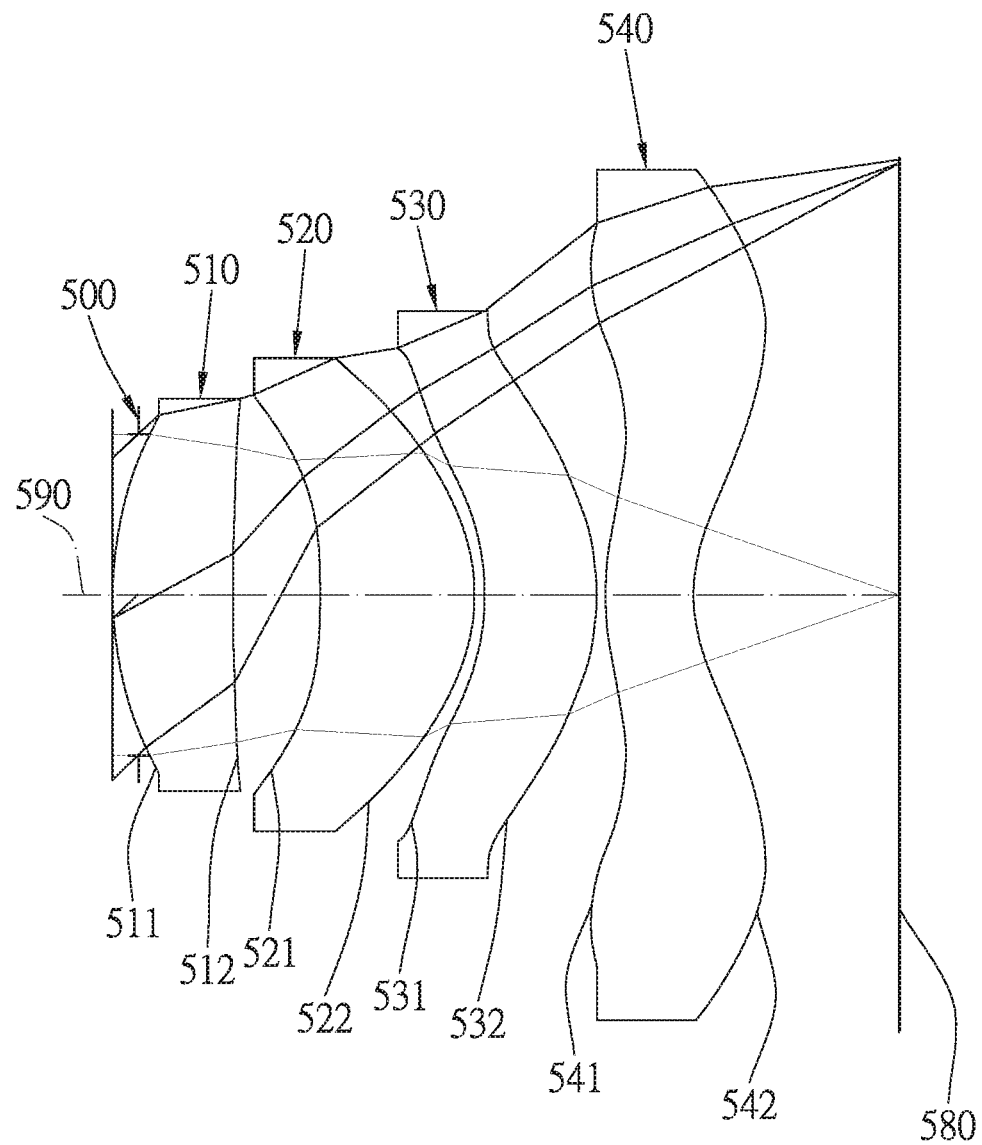
FIG. 5A shows a four-piece infrared single wavelength lens system in accordance with a fifth embodiment of the present invention.
Figure 5B:
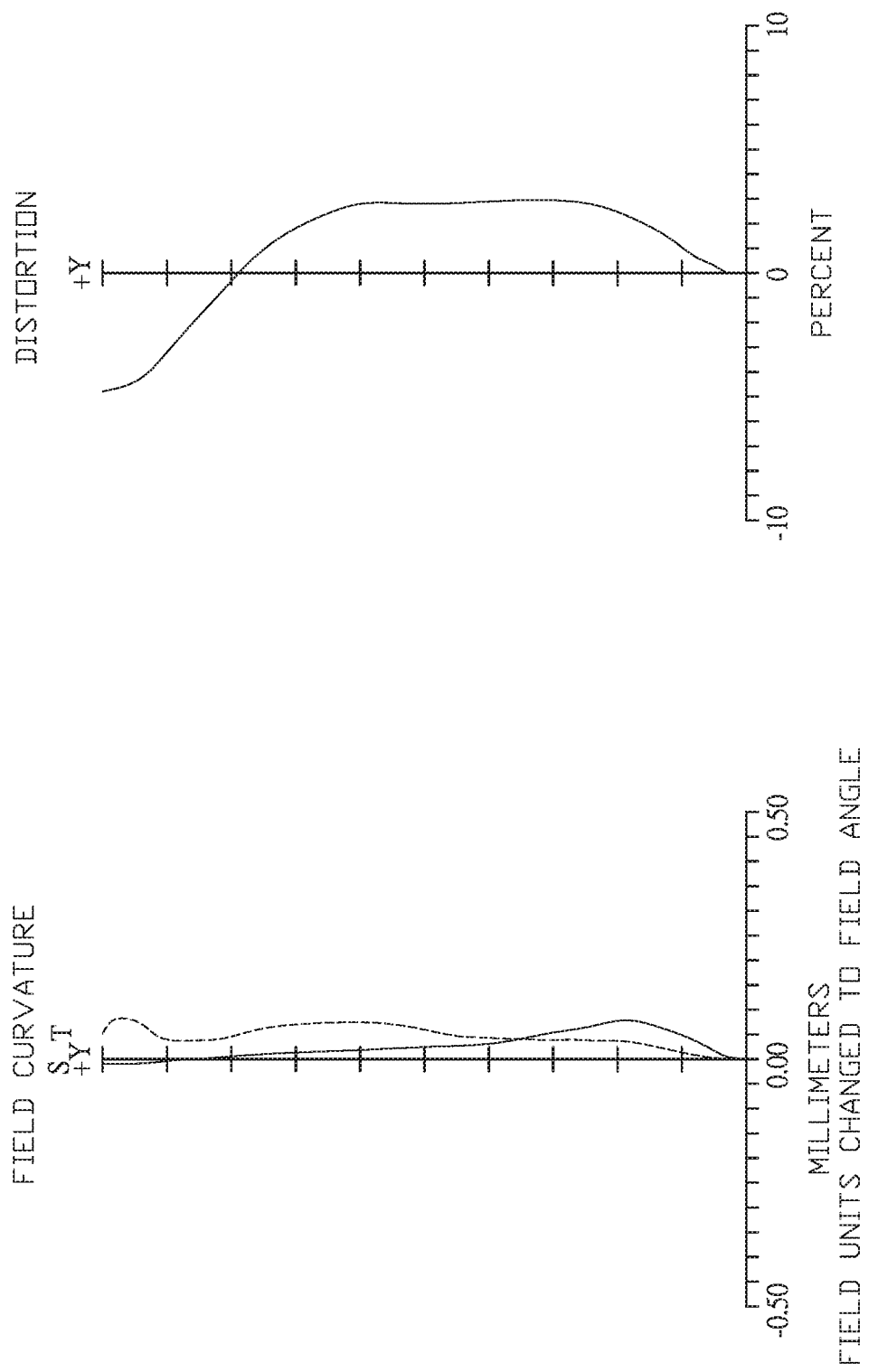
FIG. 5B shows the longitudinal spherical aberration curve, the astigmatic field curve and the distortion curve of the fifth embodiment of the present invention.

FIG. 5A shows a four-piece infrared single wavelength lens system in accordance with a fifth embodiment of the present invention, and FIG. 5B shows, in order from left to right, the longitudinal spherical aberration curves, the astigmatic field curves, and the distortion curve of the fifth embodiment of the present invention. The four-piece infrared single wavelength lens system in accordance with the fifth embodiment of the present invention comprises an aperture stop 500 and an optical assembly. The optical assembly comprises, in order from an object side to an image side: a first lens element 510, a second lens element 520, a third lens element 530, a fourth lens element 540, and an image plane 580, wherein the infrared single wavelength lens system has a total of four lens elements with refractive power. The aperture stop 500 is located between an image-side surface 512 of the first lens element 510 and an object to be photographed.

The first lens element 510 with a positive refractive power has an object-side surface 511 being convex near an optical axis 590 and the image-side surface 512 being concave near the optical axis 590, both the object-side and image-side surfaces 511, 512 are aspheric, and the first lens element 510 is made of plastic material.

The second lens element 520 with a positive refractive power has an object-side surface 521 being concave near the optical axis 590 and an image-side surface 522 being convex near the optical axis 590, both the object-side and image-side surfaces 521, 522 are aspheric, and the second lens element 520 is made of plastic material.

The third lens element 530 with a positive refractive power has an object-side surface 531 being concave near the optical axis 590 and an image-side surface 532 being convex near the optical axis 590, both the object-side and image-side surfaces 531, 532 are aspheric, the third lens element 530 is made of plastic material.

The fourth lens element 540 with a negative refractive power has an object-side surface 541 being convex near the optical axis 590 and an image-side surface 542 being concave near the optical axis 590, both the object-side and image-side surfaces 541, 542 are aspheric, the fourth lens element 540 is made of plastic material, and at least one inflection point is formed on the object-side surface 541 and the image-side surface 542 of the fourth lens element 540.

The detailed optical data of the fifth embodiment is shown in table 9, and the aspheric surface data is shown in table 10.

TABLE 9

Embodiment 5
f(focal length) = 1.651 mm, Fno = 1.5, FOV = 87 deg.

| Surface | | Curvature Radius | | Thickness | Material | index | Abbe # | Focal length |
|---|---|---|---|---|---|---|---|---|
| 0 | object | plane | | 1000.000 | | | | |
| 1 | | plane | | 0.088 | | | | |
| 2 | Aperture stop | plane | | −0.088 | | | | |
| 3 | lens 1 | 1.296 | (ASP) | 0.415 | plastic | 1.535 | 56.000 | 2.856 |
| 4 | | 8.276 | (ASP) | 0.303 | | | | |
| 5 | lens 2 | −1.911 | (ASP) | 0.531 | plastic | 1.636 | 23.970 | 1.585 |
| 6 | | −0.714 | (ASP) | 0.034 | | | | |
| 7 | lens 3 | −0.773 | (ASP) | 0.388 | plastic | 1.535 | 56.000 | 9.506 |
| 8 | | −0.786 | (ASP) | 0.031 | | | | |
| 9 | lens 4 | 0.913 | (ASP) | 0.301 | plastic | 1.535 | 56.000 | −2.735 |
| 10 | | 0.496 | (ASP) | 0.716 | | | | |
| 11 | image plane | plane | | | | | | |

TABLE 10

Aspheric Coefficients

| | surface | | | |
|---|---|---|---|---|
| | 3 | 4 | 5 | 6 |
| K: | 4.9794E−01 | 4.5837E+01 | 4.0891E+00 | −7.9266E−01 |
| A: | 3.7382E−01 | 9.3176E−02 | −2.6968E−01 | −3.4358E−01 |
| B: | −6.1104E+00 | −1.6832E+00 | −3.7222E+00 | 1.3373E+00 |
| C: | 4.3667E+01 | 8.4702E+00 | 2.0990E+01 | −2.7419E+00 |
| D: | −1.6044E+02 | −2.0927E+01 | −5.5783E+01 | 9.8870E+00 |
| E: | 2.8976E+02 | 2.6672E+01 | 7.6743E+01 | −2.0163E+01 |
| F: | −2.0498E+02 | −1.3993E+01 | −3.9035E+01 | 1.3570E+01 |

| | surface | | | |
|---|---|---|---|---|
| | 7 | 8 | 9 | 10 |
| K: | −3.5274E−01 | −1.6196E+00 | −1.5590E+01 | −3.9414E+00 |
| A: | 4.1874E−01 | 4.1944E−01 | −1.1231E−01 | −2.4454E−01 |
| B: | −1.2544E−01 | −1.5520E+00 | −1.0772E+00 | −8.3701E−03 |
| C: | 5.2010E+00 | 2.5617E+00 | 1.8161E+00 | 1.8965E−01 |
| D: | −1.3963E+01 | −2.4637E+00 | −1.1938E+00 | −2.1312E−01 |
| E: | 1.4766E+01 | 1.9134E+00 | 3.7337E−01 | 9.7222E−02 |
| F: | −5.8032E+00 | −7.2651E−01 | −4.6883E−02 | −1.5721E−02 |

In the fifth embodiment, the equation of the aspheric surface profiles of the aforementioned lens elements is the same as the equation of the first embodiment. Also, the definitions of these parameters shown in the following table are the same as those stated in the first embodiment with corresponding values for the second embodiment, so an explanation in this regard will not be provided again.

Moreover, these parameters can be calculated from Table 9 and Table 10 as the following values and satisfy the following conditions:

| Embodiment 5 | | | |
|---|---|---|---|
| f[mm] | 1.651 | f12/f34 | −0.40 |
| Fno | 1.5 | f1/f23 | 1.82 |
| FOV[deg.] | 87 | f1/f234 | 1.06 |
| f1/f2 | 1.80 | f123/f4 | −0.53 |
| f2/f3 | 0.17 | T12/CT2 | 0.57 |
| f3/f4 | −3.48 | CT2/CT3 | 1.37 |
| f1/f3 | 0.30 | CT3/T34 | 12.59 |
| f2/f4 | −0.58 | V1 − V2 | 32.03 |
| f12/f3 | 0.14 | | |

Figure 6A:
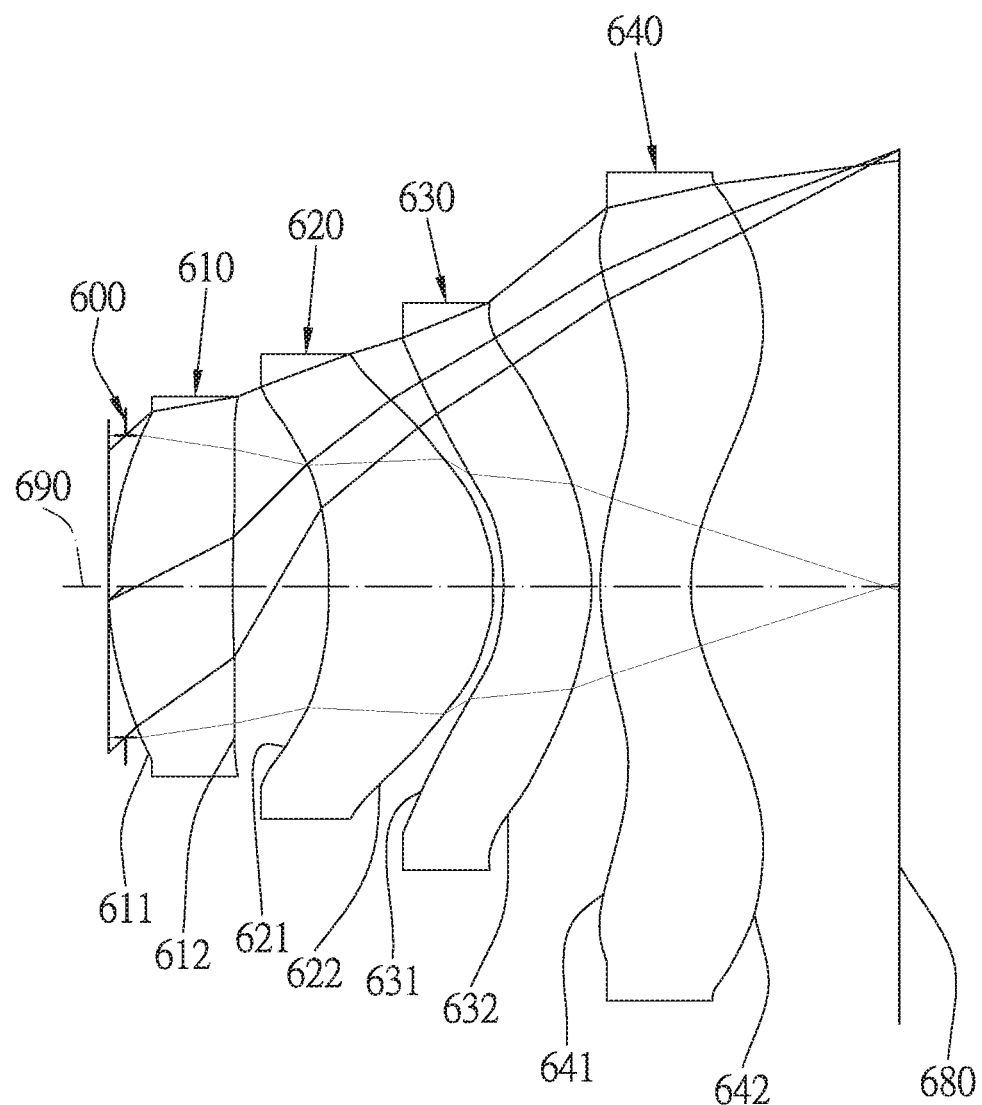
FIG. 6A shows a four-piece infrared single wavelength lens system in accordance with a sixth embodiment of the present invention.
Figure 6B:
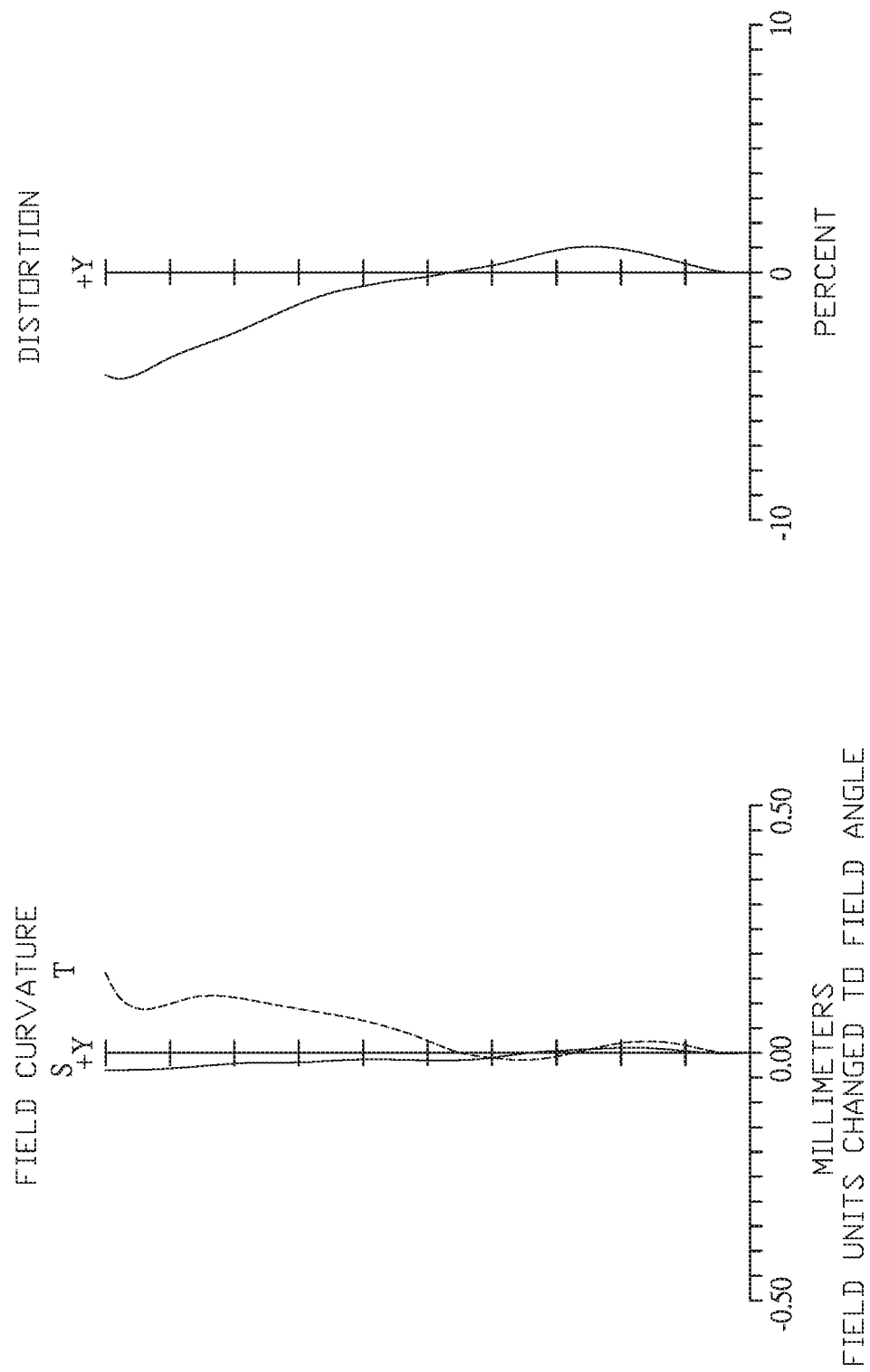
FIG. 6B shows the longitudinal spherical aberration curve, the astigmatic field curve and the distortion curve of the sixth embodiment of the present invention.

FIG. 6A shows a four-piece infrared single wavelength lens system in accordance with a sixth embodiment of the present invention, and FIG. 6B shows, in order from left to right, the longitudinal spherical aberration curves, the astigmatic field curves, and the distortion curve of the sixth embodiment of the present invention. The four-piece infrared single wavelength lens system in accordance with the sixth embodiment of the present invention comprises an aperture stop 600 and an optical assembly. The optical assembly comprises, in order from an object side to an image side: a first lens element 610, a second lens element 620, a third lens element 630, a fourth lens element 640, and an image plane 680, wherein the infrared single wavelength lens system has a total of four lens elements with refractive power. The aperture stop 600 is located between an image-side surface 612 of the first lens element 610 and an object to be photographed.

The first lens element 610 with a positive refractive power has an object-side surface 611 being convex near an optical axis 690 and the image-side surface 612 being concave near the optical axis 690, both the object-side and image-side surfaces 611, 612 are aspheric, and the first lens element 610 is made of plastic material.

The second lens element 620 with a positive refractive power has an object-side surface 621 being concave near the optical axis 690 and an image-side surface 622 being convex near the optical axis 690, both the object-side and image-side surfaces 621, 622 are aspheric, and the second lens element 620 is made of plastic material.

The third lens element 630 with a positive refractive power has an object-side surface 631 being concave near the optical axis 690 and an image-side surface 632 being concave near the optical axis 690, both the object-side and image-side surfaces 631, 632 are aspheric, the third lens element 630 is made of plastic material.

The fourth lens element 640 with a negative refractive power has an object-side surface 641 being convex near the optical axis 690 and an image-side surface 642 being concave near the optical axis 690, both the object-side and image-side surfaces 641, 642 are aspheric, the fourth lens element 640 is made of plastic material, and at least one inflection point is formed on the object-side surface 641 and the image-side surface 642 of the fourth lens element 640.

The detailed optical data of the sixth embodiment is shown in table 11, and the aspheric surface data is shown in table 12.

TABLE 11

Embodiment 6
f(focal length) = 1.703 mm, Fno = 1.6, FOV = 85 deg.

| Surface | | Curvature Radius | | Thickness | Material | index | Abbe # | Focal length |
|---|---|---|---|---|---|---|---|---|
| 0 | object | plane | | 1000.000 | | | | |
| 1 | | plane | | 0.057 | | | | |
| 2 | Aperture stop | plane | | −0.057 | | | | |
| 3 | lens 1 | 1.266 | (ASP) | 0.427 | plastic | 1.535 | 56.000 | 2.586 |
| 4 | | 15.632 | (ASP) | 0.327 | | | | |
| 5 | lens 2 | −1.629 | (ASP) | 0.566 | plastic | 1.636 | 23.970 | 1.501 |
| 6 | | −0.668 | (ASP) | 0.034 | | | | |
| 7 | lens 3 | −0.718 | (ASP) | 0.301 | plastic | 1.535 | 56.000 | 73.612 |
| 8 | | −0.807 | (ASP) | 0.031 | | | | |
| 9 | lens 4 | 0.957 | (ASP) | 0.309 | plastic | 1.535 | 56.000 | −2.695 |
| 10 | | 0.508 | (ASP) | 0.716 | | | | |
| 11 | image plane | plane | | | | | | |

TABLE 12

Aspheric Coefficients

| surface | 3 | 4 | 5 | 6 |
|---|---|---|---|---|
| K: | 3.3932E−01 | −8.5789E+00 | 2.9736E+00 | −7.2507E−01 |
| A: | 4.2183E−02 | 3.6443E−01 | 1.2379E−01 | −2.2628E+00 |
| B: | −1.3901E+00 | −5.7797E+00 | −9.6165E+00 | 1.4039E+01 |
| C: | 1.1976E+01 | 3.8670E+01 | 5.7323E+01 | −3.9322E+01 |
| D: | −5.3184E+01 | −1.3390E+02 | −1.7668E+02 | 5.9023E+01 |
| E: | 1.1057E+02 | 2.2636E+02 | 2.8868E+02 | −4.4795E+01 |
| F: | −8.4274E+01 | −1.4290E+02 | −1.8332E+02 | 1.4332E+01 |

| surface | 7 | 8 | 9 | 10 |
|---|---|---|---|---|
| K: | −3.7982E−01 | −1.8921E+00 | −7.8723E+00 | −3.4386E+00 |
| A: | −2.4769E+00 | 7.0739E−01 | 6.9304E−02 | −2.7835E−01 |
| B: | 2.1453E+01 | −2.8563E+00 | −1.7039E+00 | −3.2848E−02 |
| C: | −6.4453E+01 | 7.0128E+00 | 2.8451E+00 | 1.6610E−01 |
| D: | 1.0167E+02 | −1.1660E+01 | −2.1233E+00 | −8.0593E−02 |
| E: | −8.1991E+01 | 1.0747E+01 | 7.8763E−01 | −2.1614E−03 |
| F: | 2.7275E+01 | −3.8100E+00 | −1.1709E−01 | 6.1709E−03 |

In the sixth embodiment, the equation of the aspheric surface profiles of the aforementioned lens elements is the same as the equation of the first embodiment. Also, the definitions of these parameters shown in the following table are the same as those stated in the first embodiment with corresponding values for the second embodiment, so an explanation in this regard will not be provided again.

Moreover, these parameters can be calculated from Table 11 and Table 12 as the following values and satisfy the following conditions:

| Embodiment 6 | | | |
|---|---|---|---|
| f[mm] | 1.703 | f12/f34 | −0.53 |
| Fno | 1.6 | f1/f23 | 1.54 |
| FOV[deg.] | 85 | f1/f234 | 0.79 |
| f1/f2 | 1.72 | f123/f4 | −0.55 |
| f2/f3 | 0.02 | T12/CT2 | 0.58 |
| f3/f4 | −27.32 | CT2/CT3 | 1.88 |
| f1/f3 | 0.04 | CT3/T34 | 9.77 |
| f2/f4 | −0.56 | V1 − V2 | 32.03 |
| f12/f3 | 0.02 | | |

Figure 7A:
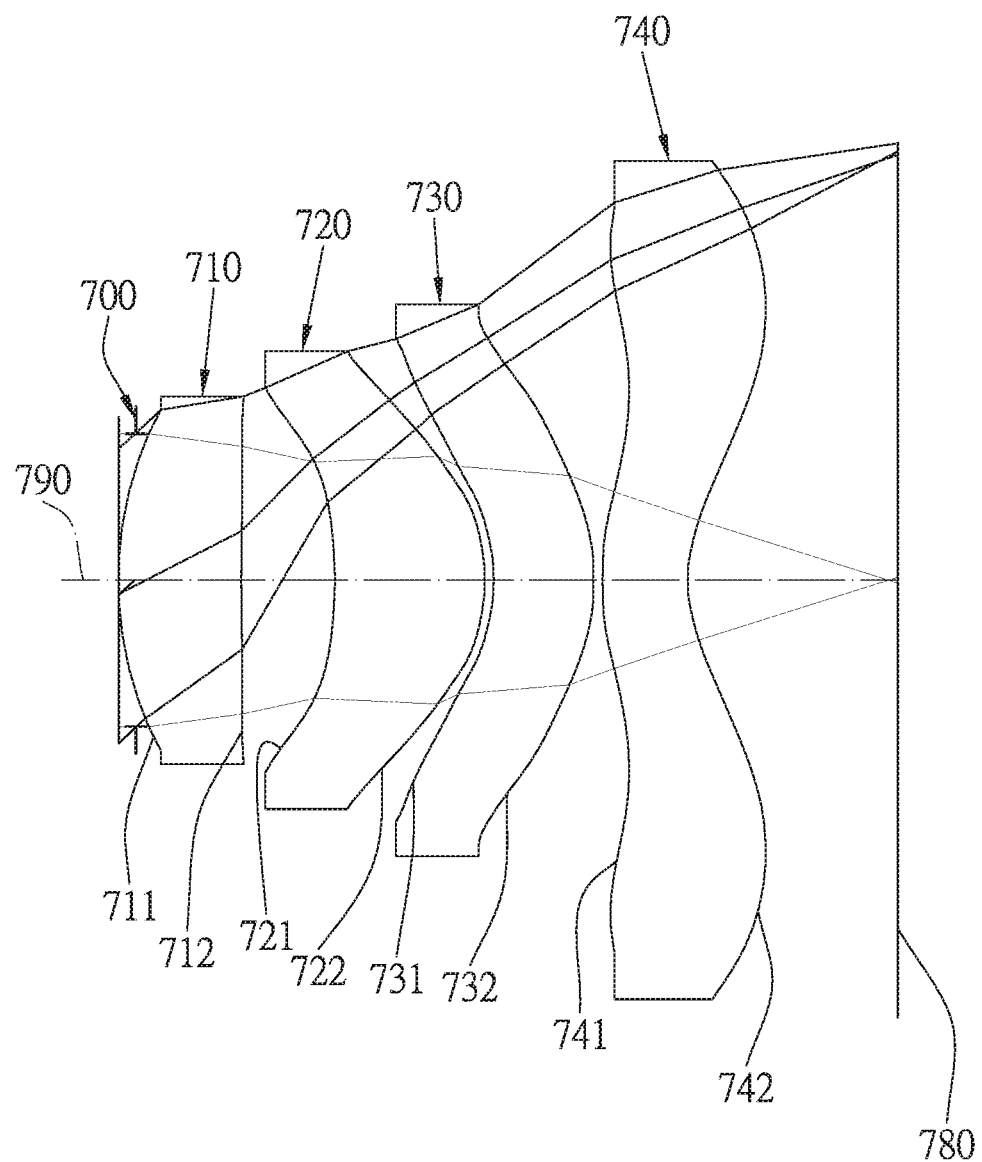
FIG. 7A shows a four-piece infrared single wavelength lens system in accordance with a seventh embodiment of the present invention.

FIG. 7A shows a four-piece infrared single wavelength lens system in accordance with a seventh embodiment of the present invention, and FIG. 7B shows, in order from left to right, the longitudinal spherical aberration curves, the astigmatic field curves, and the distortion curve of the seventh embodiment of the present invention. The four-piece infrared single wavelength lens system in accordance with the seventh embodiment of the present invention comprises an aperture stop 700 and an optical assembly. The optical assembly comprises, in order from an object side to an image side: a first lens element 710, a second lens element 720, a third lens element 730, a fourth lens element 740, and an image plane 780, wherein the infrared single wavelength lens system has a total of four lens elements with refractive power. The aperture stop 700 is located between an image-side surface 712 of the first lens element 710 and an object to be photographed.

The first lens element 710 with a positive refractive power has an object-side surface 711 being convex near an optical axis 790 and the image-side surface 712 being concave near the optical axis 790, both the object-side and image-side surfaces 711, 712 are aspheric, and the first lens element 710 is made of plastic material.

The second lens element 720 with a positive refractive power has an object-side surface 721 being concave near the optical axis 790 and an image-side surface 722 being convex near the optical axis 790, both the object-side and image-side surfaces 721, 722 are aspheric, and the second lens element 720 is made of plastic material.

The third lens element 730 with a positive refractive power has an object-side surface 731 being concave near the optical axis 790 and an image-side surface 732 being convex near the optical axis 790, both the object-side and image-side surfaces 731, 732 are aspheric, the third lens element 730 is made of plastic material.

The fourth lens element 740 with a negative refractive power has an object-side surface 741 being convex near the optical axis 790 and an image-side surface 742 being concave near the optical axis 790, both the object-side and image-side surfaces 741, 742 are aspheric, the fourth lens element 740 is made of plastic material, and at least one inflection point is formed on the object-side surface 741 and the image-side surface 742 of the fourth lens element 740.

The detailed optical data of the seventh embodiment is shown in table 13, and the aspheric surface data is shown in table 14.

TABLE 13

Embodiment 7
f(focal length) = 1.697 mm, Fno = 1.6, FOV = 85 deg.

| Surface | | Curvature Radius | | Thickness | Material | index | Abbe # | Focal length |
|---|---|---|---|---|---|---|---|---|
| 0 | object | plane | | 1000.000 | | | | |
| 1 | | plane | | 0.058 | | | | |
| 2 | Aperture stop | plane | | −0.058 | | | | |
| 3 | lens 1 | 1.263 | (ASP) | 0.428 | plastic | 1.535 | 56.000 | 2.631 |
| 4 | | 12.374 | (ASP) | 0.329 | | | | |
| 5 | lens 2 | −1.596 | (ASP) | 0.523 | plastic | 1.636 | 23.970 | 1.585 |
| 6 | | −0.681 | (ASP) | 0.032 | | | | |
| 7 | lens 3 | −0.696 | (ASP) | 0.348 | plastic | 1.535 | 56.000 | 6.832 |
| 8 | | −0.684 | (ASP) | 0.030 | | | | |
| 9 | lens 4 | 1.037 | (ASP) | 0.301 | plastic | 1.535 | 56.000 | −2.281 |
| 10 | | 0.501 | (ASP) | 0.735 | | | | |
| 11 | image plane | plane | | | | | | |

TABLE 14

Aspheric Coefficients

| surface | | | | |
|---|---|---|---|---|
| | 3 | 4 | 5 | 6 |
| K: | 6.0776E−01 | 1.3075E+02 | 3.3804E+00 | −7.3601E−01 |
| A: | −1.3530E−01 | 1.1483E−01 | −1.7176E−01 | −2.1319E+00 |
| B: | 5.7670E−01 | −2.5576E+00 | −5.3634E+00 | 1.3916E+01 |
| C: | −1.4823E+00 | 1.4563E+01 | 2.6733E+01 | −4.2475E+01 |
| D: | −6.7240E+00 | −4.4376E+01 | −7.1231E+01 | 7.0267E+01 |
| E: | 3.2157E+01 | 6.4593E+01 | 1.2030E+02 | −5.7655E+01 |
| F: | −3.2192E+01 | −2.9790E+01 | −8.2568E+01 | 1.8410E+01 |

| surface | | | | |
|---|---|---|---|---|
| | 7 | 8 | 9 | 10 |
| K: | −4.1389E−01 | −2.0049E+00 | −7.0955E+00 | −3.3474E+00 |
| A: | −2.0462E+00 | 7.0824E−01 | 2.3388E−02 | −2.5029E−01 |
| B: | 1.9555E+01 | −2.9204E+00 | −1.3380E+00 | −3.7454E−02 |
| C: | −6.1526E+01 | 6.9669E+00 | 2.1088E+00 | 1.6118E−01 |
| D: | 1.0278E+02 | −1.1286E+01 | −1.4155E+00 | −1.0120E−01 |
| E: | −8.8429E+01 | 1.0296E+01 | 4.5819E−01 | 2.5140E−02 |
| F: | 3.1389E+01 | −3.6368E+00 | −5.8750E−02 | −2.0208E−03 |

In the seventh embodiment, the equation of the aspheric surface profiles of the aforementioned lens elements is the same as the equation of the first embodiment. Also, the definitions of these parameters shown in the following table are the same as those stated in the first embodiment with corresponding values for the second embodiment, so an explanation in this regard will not be provided again.

Moreover, these parameters can be calculated from Table 13 and Table 14 as the following values and satisfy the following conditions:

| Embodiment 7 | | | |
|---|---|---|---|
| f[mm] | 1.697 | f12/f34 | −0.45 |
| Fno | 1.6 | f1/f23 | 1.79 |
| FOV[deg.] | 85 | f1/f234 | 0.86 |
| f1/f2 | 1.66 | f123/f4 | −0.61 |
| f2/f3 | 0.23 | T12/CT2 | 0.63 |
| f3/f4 | −3.00 | CT2/CT3 | 1.50 |
| f1/f3 | 0.39 | CT3/T34 | 11.61 |
| f2/f4 | −0.69 | V1 − V2 | 32.03 |
| f12/f3 | 0.20 | | |

In the present four-piece infrared single wavelength lens system, the lens elements can be made of plastic or glass. If the lens elements are made of plastic, the cost will be effectively reduced. If the lens elements are made of glass, there is more freedom in distributing the refractive power of the four-piece infrared single wavelength lens system. Plastic lens elements can have aspheric surfaces, which allow more design parameter freedom (than spherical surfaces), so as to reduce the aberration and the number of the lens elements, as well as the total track length of the five-piece optical imaging lens.

In the present four-piece infrared single wavelength lens system, if the object-side or the image-side surface of the lens elements with refractive power is convex and the location of the convex surface is not defined, the object-side or the image-side surface of the lens elements near the optical axis is convex. If the object-side or the image-side surface of the lens elements is concave and the location of the concave surface is not defined, the object-side or the image-side surface of the lens elements near the optical axis is concave.

The four-piece infrared single wavelength lens system of the present invention can be used in focusing optical systems and can obtain better image quality. The four-piece infrared single wavelength lens system of the present invention can also be used in electronic imaging systems, such as, 3D image capturing, digital camera, mobile device, digital flat panel or vehicle camera.

The embodiments depicted above and the appended drawings are exemplary and are not intended to be exhaustive or to limit the scope of the present disclosure to the precise forms disclosed. Many modifications and variations are possible in view of the above teachings.

While we have shown and described various embodiments in accordance with the present invention, it is clear to those skilled in the art that further embodiments may be made without departing from the scope of the present invention.

What is claimed is:

1. A four-piece infrared single wavelength lens system, in order from an object side to an image side, comprising:
   an aperture;
   a first lens element with a positive refractive power having an object-side surface being convex near an optical axis and an image-side surface being concave near the optical axis, at least one of the object-side and image-side surfaces of the first lens element being aspheric;
   a second lens element with a positive refractive power having an object-side surface being concave near the optical axis and an image-side surface being convex near the optical axis, at least one of the object-side and image-side surfaces of the second lens element being aspheric;
   a third lens element with a positive refractive power having an object-side surface being concave near the optical axis and an image-side surface being convex near the optical axis, both the object-side and image-side surfaces of the third lens element being aspheric; and
   a fourth lens element with a negative refractive power having an object-side surface being convex near the optical axis and an image-side surface being concave near the optical axis, one of the object-side and image-side surfaces of the fourth lens element being aspheric, and at least one inflection point being formed on one of the object-side surface and the image-side surface of the fourth lens element;
   wherein a focal length of the first lens element is f1, a focal length of the second lens element, the third lens element and the fourth lens element combined is f234, and they satisfy the relation: 0.3<f1/f234<1.3.

2. The four-piece infrared single wavelength lens system as claimed in claim 1, wherein the focal length of the first lens element is f1, a focal length of the second lens element is f2, and they satisfy the relation: 0.8<f1/f2<2.3.

3. The four-piece infrared single wavelength lens system as claimed in claim 1, wherein a focal length of the second lens element is f2, a focal length of the third lens element is f3, and they satisfy the relation: −0.6<f2/f3<0.5.

4. The four-piece infrared single wavelength lens system as claimed in claim 1, wherein a focal length of the third lens element is f3, a focal length of the fourth lens element is f4, and they satisfy the relation: −28<f3/f4<3.

5. The four-piece infrared single wavelength lens system as claimed in claim 1, wherein the focal length of the first lens element is f1, a focal length of the third lens element is f3, and they satisfy the relation: −0.9<f1/f3<0.7.

6. The four-piece infrared single wavelength lens system as claimed in claim 1, wherein a focal length of the second lens element is f2, a focal length of the fourth lens element is f4, and they satisfy the relation: −1<f2/f4<0.2.

7. The four-piece infrared single wavelength lens system as claimed in claim 1, wherein a focal length of the first lens element and the second lens element combined is f12, a focal length of the third lens element is f3, and they satisfy the relation: −0.6<f12/f3<0.5.

8. The four-piece infrared single wavelength lens system as claimed in claim 1, wherein a focal length of the first lens element and the second lens element combined is f12, a focal length of the third lens element and the fourth lens element combined is f34, and they satisfy the relation: −1.0<f12/f34<−0.05.

9. The four-piece infrared single wavelength lens system as claimed in claim 1, wherein the focal length of the first lens element is f1, a focal length of the second lens element and the third lens element combined is f23, and they satisfy the relation: 0.3<f1/f23<2.1.

10. The four-piece infrared single wavelength lens system as claimed in claim 1, wherein a focal length of the first lens element, the second lens element and the third lens element combined is f123, the focal length of the fourth lens element is f4, and they satisfy the relation: −1<f123/f4<0.1.

11. The four-piece infrared single wavelength lens system as claimed in claim 1, wherein a distance along the optical axis between the first lens element and the second lens element is T12, a central thickness of the second lens element along the optical axis is CT2, and they satisfy the following relation: 0.3<T12/CT2<1.0.

12. The four-piece infrared single wavelength lens system as claimed in claim 1, wherein a central thickness of the second lens element along the optical axis is CT2, a central thickness of the third lens element along the optical axis is CT3, and they satisfy the following relation: 0.5<CT2/CT3<2.2.

13. The four-piece infrared single wavelength lens system as claimed in claim 1, wherein a central thickness of the third lens element along the optical axis is CT3, a distance along the optical axis between the third lens element and the fourth lens element is T34, and they satisfy the following relation: 7<CT3/T34<18.

14. The four-piece infrared single wavelength lens system as claimed in claim 1, wherein an Abbe number of the first lens element is V1, an Abbe number of the second lens element is V2, and they satisfy the relation: 30<V1−V2<42.

15. The four-piece infrared single wavelength lens system as claimed in claim 1, wherein a maximal field of view of the four-piece infrared single wavelength lens system is FOV, and 70<FOV<100.

* * * * *